United States Patent
Yang et al.

(10) Patent No.: US 10,587,936 B2
(45) Date of Patent: Mar. 10, 2020

(54) OPTICAL SYSTEMS

(71) Applicant: Roadmap Systems Ltd, Cambridge (GB)

(72) Inventors: Haining Yang, Cambridge (GB); Daping Chu, Cambridge (GB); Brian Robertson, Cambridge (GB)

(73) Assignee: Roadmap Systems Ltd, Cambridge (GB)

( * ) Notice: Subject to any disclaimer, the term of this patent is extended or adjusted under 35 U.S.C. 154(b) by 0 days.

(21) Appl. No.: 15/762,179

(22) PCT Filed: Sep. 19, 2016

(86) PCT No.: PCT/GB2016/052913
§ 371 (c)(1),
(2) Date: Mar. 22, 2018

(87) PCT Pub. No.: WO2017/051158
PCT Pub. Date: Mar. 30, 2017

(65) Prior Publication Data
US 2018/0288504 A1    Oct. 4, 2018

(30) Foreign Application Priority Data
Sep. 23, 2015 (GB) .................................. 1516870.1

(51) Int. Cl.
*H04J 14/00* (2006.01)
*H04Q 11/00* (2006.01)
*H04J 14/02* (2006.01)

(52) U.S. Cl.
CPC ...... *H04Q 11/0003* (2013.01); *H04J 14/0212* (2013.01); *H04Q 11/0005* (2013.01); *H04Q 2011/0016* (2013.01)

(58) Field of Classification Search
USPC ......................................................... 398/45
See application file for complete search history.

(56) References Cited

U.S. PATENT DOCUMENTS 7,397,980 B2    7/2008  Frisken
8,542,712 B2 *  9/2013  Rafailov ............ G02B 27/0927
                                                        359/641
(Continued)

FOREIGN PATENT DOCUMENTS

WO    2012/123713 A2    9/2012
WO    2012/123715 A1    9/2012
(Continued)

OTHER PUBLICATIONS

O'Brien et al., "Dynamic Holographic Interconnects That Use Ferroelectric Liquid-Crystal Spatial Light Modulators", "Applied Optics", May 10, 1994, pp. 2795-2803, vol. 33, No. 14, Publisher: Optical Society of America, Published in: Washington, USA.

*Primary Examiner* — David C Payne
*Assistant Examiner* — Pranesh K Barua
(74) *Attorney, Agent, or Firm* — Loginov & Associates, PLLC; William A. Loginov

(57) ABSTRACT

A wavelength division multiplexed (WDM) reconfigurable optical switch, the switch has at least one optical input port to receive a WDM input optical signal comprising a plurality of wavelength channels; a plurality of optical output ports; a reconfigurable holographic array on an optical path between the at least one optical input port and the plurality of optical output ports; and at least one diffractive element on an optical path between at least one optical input port and the reconfigurable holographic array, to demultiplex the WDM input optical signal into a plurality of demultiplexed optical input beam channels, and to disperse the demultiplexed optical input beam channels spatially along a first axis on said the reconfigurable holographic array; and the switch further comprises one or more beam profiling optical elements to modify transverse beam profiles of the demultiplexed optical input beam channels.

18 Claims, 22 Drawing Sheets

(56) References Cited

U.S. PATENT DOCUMENTS

| | | | |
|---|---|---|---|
| 8,867,917 B2 | 10/2014 | Frisken et al. | |
| 2003/0053221 A1* | 3/2003 | Coufal | G02B 13/18 |
| | | | 359/708 |
| 2004/0190822 A1* | 9/2004 | Yamamoto | G02B 6/2713 |
| | | | 385/24 |
| 2009/0028503 A1* | 1/2009 | Garrett | G02B 6/29311 |
| | | | 385/18 |
| 2012/0219252 A1* | 8/2012 | Marom | G02B 6/3556 |
| | | | 385/16 |
| 2016/0294146 A1* | 10/2016 | Tsia | G02B 17/006 |

FOREIGN PATENT DOCUMENTS

| | | | | |
|---|---|---|---|---|
| WO | WO 2012-123715 | * | 9/2012 | |
| WO | WO-2012123715 A1 | * | 9/2012 | G02F 1/292 |

\* cited by examiner

— side view —

— top view —

— fibre array — — SLM plane —

— system view —

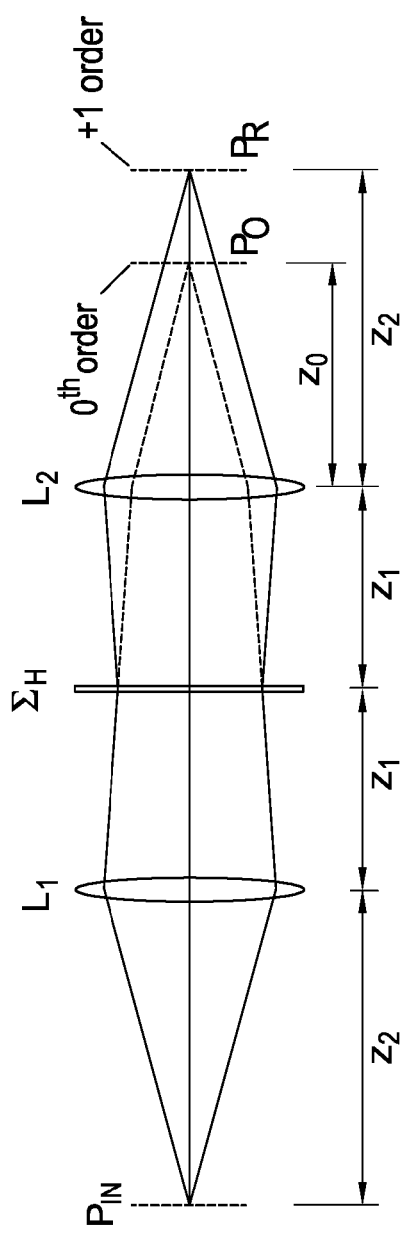
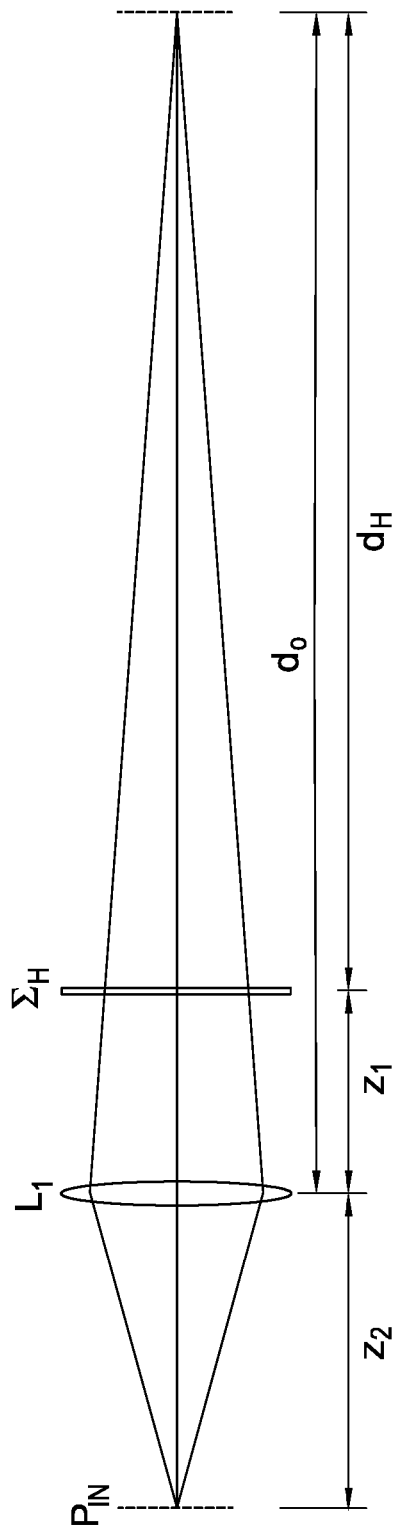
Figure 20a
Figure 20b

OPTICAL SYSTEMS

FIELD OF THE INVENTION

This invention relates to systems and methods for improved processing of wavelength division multiplexed (WDM) signals, in particular for optical switches.

BACKGROUND TO THE INVENTION

There is a general desire to improve the capacity and performance of switches/routers in optical telecommunication systems. One approach is to employ wavelength division multiplexed signals and wavelength selective switches (WSSs), which may be employed in a reconfigurable optical add/drop multiplexer (ROADM) or the like. Background prior art can be found in U.S. Pat. Nos. 7,397,980 8,867,917.

We have previously described techniques for mitigating crosstalk in such devices (our WO2012/123715) but there is a general drive for still further improved performance and, in particular, techniques which can mitigate deleterious effects which can accumulate when multiple switches are cascaded.

SUMMARY OF THE INVENTION

According to the present invention there is therefore provided a wavelength division multiplexed (WDM) reconfigurable optical switch, the switch comprising: at least one optical input port to receive a WDM input optical signal comprising a plurality of wavelength channels; a plurality of optical output ports; a reconfigurable holographic array on an optical path between said at least one optical input port and said plurality of optical output ports; and at least one diffractive element on an optical path between at least one optical input port and said reconfigurable holographic array, to demultiplex said WDM input optical signal into a plurality of demultiplexed optical input beam channels, and to disperse said demultiplexed optical input beam channels spatially along a first axis on said reconfigurable holographic array; wherein said reconfigurable holographic array comprises an array of configurable sub-holograms, said array extending along said first axis, wherein a sub-hologram is configured to direct a demultiplexed optical input beam channel to a respective selected one of said optical outputs; and wherein the switch further comprises one or more beam profiling optical elements to modify transverse beam profiles of said demultiplexed optical input beam channels to modified beam profiles, wherein a said modified beam profile comprises a beam profile having one or more characteristics selected from the group consisting of: a flattened beam profile, a steeper-sided beam profile, and a beam profile which better fits a rectangular envelope.

In embodiments of such a reconfigurable optical switch the WDM channels are dispersed by the diffractive element, typically a grating, along the first (wavelength) axis. Typically the separation of adjacent WDM channels is determined by the diffractive power of the diffractive element, for example the line density of a static grating, and by the focal length of any relay optics between the diffractive element and the holographic array. (The holographic array is typically displayed on a spatial light modulator, SLM, for example an LCOS—Liquid Crystal On Silicon—SLM, in a reflective device configuration). Thus in a typical embodiment of a switch the apparatus may determine the size of a beam on the holographic array. Generally the beam size of an unmodulated beam is arranged to be smaller than that of a sub-hologram (which, for example, displays a blazed grating) that steers or deflects that particular beam. Where the unmodulated beam is smaller than the hologram the hologram effectively captures substantially all the power in the beam and directs this into the target output port.

However, in use, the WDM beams are modulated, and this has the effect of broadening the range of frequencies encompassed by a particular beam of the WDM channel. This in turn translates to a wider beam on a sub-hologram of the holographic array. That is, a dimension of the (transverse) beam profile increases in the direction of dispersion. For example WDM channels may be spaced at 50 GHz intervals and a WDM channel at, say, 194000 GHz (1545.32 nm) may have a 200 Gbit per second/s DPSK (differential phase shift keying) modulation. The inventors have recognised that this can spread the beam beyond the 50 GHz channel allocation in frequency space, and beyond the edges of the sub-hologram in physical space. The inventors have further recognised that this can have various deleterious effects including reduced beam energy, increased crosstalk, and undesirable roll-off in the frequency response, which can increase bit error rate. Furthermore, modelling has indicated that whilst this need not be a substantial effect or a single pass/reflection by a reconfigurable holographic array, multiple passes and/or cascaded devices can accumulate such effects, particularly where there is some misalignment between devices. Accordingly the inventors have still further recognised that this problem can be mitigated by changing the transverse beam profile of a demultiplexed optical beam within a switch (or other device) so as to give the profile a flatter top and/or more steeply sloping sides (measuring the slope at, say, half-maximum), in embodiments to make the profile a better fit to a rectangular envelope.

In embodiments the transverse beam profile is the beam profile along said first (dispersion) axis. In embodiments the rectangular envelope has a width which substantially matches a width of a sub-hologram (measured along the first, dispersion axis) steering a demultiplexed beam channel; the transverse beam width may be less than this but is preferably not substantially greater than this. The (spatial) width of the transverse beam profile may be defined as the width at a defined passband, for example a −10 dB, −5 dB, −3 dB or −0.5 dB passband. In embodiments the rectangular envelope may also have a width which substantially matches (or fits within) a width of a sub-hologram measured perpendicular to the first, dispersion axis. Such a sub-hologram may be substantially square, or rectangular. In embodiments the system is configured so that a sub-hologram intercepts greater than 95%, 98% or 99% of the power in a demultiplexed beam.

Preferably the transverse beam profile is modified to flatten the beam profile. Such a flattened beam profile may comprise, for example, a super Gaussian beam profile, a flattened Gaussian beam profile, a Fermi-Dirac beam profile, a super Lorentzian beam profile, or a related flattened beam profile. Conveniently, but not essentially, a demultiplexed beam may be converted from a Gaussian beam profile into, say, a super Gaussian beam profile. However the skilled person will appreciate that embodiments of the invention are not restricted to use with beams having a Gaussian profile, or to conversion to a super Gaussian profile, and the techniques we describe allow the skilled person to choose other beam profiles, should these be desired. Thus, in embodiments a demultiplexed beam is converted from a Gaussian beam profile into a non-Gaussian beam profile, more particularly a flattened beam profile.

In principle only the one or more input beams in the switch need to have their profiles modified, but in practice it is desirable to convert the beam profiles of the output beams back (for example, to a Gaussian beam) prior to their output, in particular to facilitate efficient coupling into the output ports.

In some preferred embodiments one or more fibres, or fibre arrays, or multicore fibres may be coupled to the input and/or output ports, and the techniques we describe facilitate high coupling efficiency. However the use of fibres is not essential.

In preferred embodiments a refractive and/or diffractive optical element is employed to change the beam profiles (rather than, say, an attenuating optical element). Such an optical element may be either transmissive or reflective. As we describe later such an optical element may impose a phase profile on a beam to change the beam profile. Here the beam profile refers to the transverse amplitude (or intensity) profile of the beam in frequency space prior to dispersion, and to the profile of the beam in physical space after the diffractive element. The skilled person will recognise that such a phase profile may be imposed by either a refractive or a diffractive element or using a combination of the two.

In one approach a suitable phase profile may be imposed onto the diffractive element. In another, related approach the beam profile may be modified by an additional optical element located adjacent to (in substantially the same optical plane as) the at least one diffractive element. It will be appreciated that these approaches may be combined.

In yet another approach each input/output WDM path prior to diffraction, for example each fibre of an input/output fibre array, may be provided with a respective beam profile modifying element. Conveniently substantially the same element may be employed for each input/output port, to flatten the beam profile incident upon the hologram and to restore the original beam profile to an output beam. In one approach an array of elements may be provided adjacent to the ports (or fibre array) themselves. In this case it can be advantageous to provide an array of lenses in between the I/O ports (with their respective beam profiling elements) and a focal plane defined by relay optics relaying light to and or/from the diffractive element. Such an array of lenses (lenslet array) may advantageously be employed to increase the effective input/output mode field radius of each port. Preferably, therefore, the spatial pitch of the lenses of the array substantially matches that of the input/output ports. In still further embodiments an array of beam profiling elements may be combined with such a lens (lenslet) array by modifying the lens shapes.

Although typically only one of the above described approaches may be employed, in principle one or more of the different approaches described above may be combined.

In embodiments of a WDM optical switch described later the reconfigurable holographic array is provided on a reflective LCOS SLM, and thus the optical path of the switch is folded so that the input and output ports are on the same side of the device. However the techniques we describe may also be employed with an "unfolded" optical path, in which a transmissive SLM is employed.

The techniques we describe may be employed with switches of varying degrees of complexity—for example the sub-holograms may be either stripe holograms or square or rectangular sub-holograms, as described later. Thus the array of sub-holograms on the reconfigurable holographic array may be either a 1-dimensional or 2-dimensional array of reconfigurable sub-holograms. In principle the techniques we describe may be employed more generally when processing WDM signals.

Thus in a related aspect the invention provides a method of routing a wavelength division multiplexed (WDM) signal comprising a plurality of wavelength channels, the method comprising: dispersing said WDM signal into a plurality of demultiplexed beams each comprising a WDM channel; providing said demultiplexed beams to a set of respective beam steering elements each for steering a respective WDM channel; generating a plurality of steered beams from said beam steering elements, one for each WDM channel; and routing said steered beams into selected beam outputs; wherein the method further comprises modifying transverse beam profiles of said demultiplexed beams to modified beam profiles, wherein a said modified beam profile comprises a beam profile having one or more characteristics selected from the group consisting of: a flattened beam profile, a steeper-sided beam profile, and a beam profile which better fits a rectangular envelope.

In embodiments the method matches a transverse spatial dimension (or two orthogonal transverse spatial dimensions) of a demultiplexed beam to a corresponding transverse spatial dimensions (or to two orthogonal transverse spatial dimensions) of a beam-steering sub-hologram displayed on an SLM. Such matching may have, but does not require, an equality of dimensions.

As previously described, embodiments of the above described switches and methods are particularly advantageous when cascading multiple beam steering devices in series, and embodiments of the invention particularly contemplate such applications.

Secure Routing

We also describe herein techniques for improving the security of a switch, which develop the techniques we have previously described in WO2012/123715.

Thus in a further aspect the invention provides a wavelength division multiplexed (WDM) reconfigurable optical switch, the switch comprising: at least one optical input port to receive a WDM input optical signal comprising a plurality of wavelength channels; a plurality of optical output ports; a spatial light modulator (SLM) for displaying a reconfigurable holographic array, wherein the SLM is located on an optical path between said at least one optical input port and said plurality of optical output ports; and at least one diffractive element on an optical path between at least one optical input port and said reconfigurable holographic array, to demultiplex said WDM input optical signal into a plurality of demultiplexed optical input beam channels, and to disperse said demultiplexed optical input beam channels spatially along a first axis on said reconfigurable holographic array; wherein said reconfigurable holographic array comprises an array of configurable sub-holograms, said array extending along said first axis, wherein a sub-hologram is configured to direct a demultiplexed optical input beam channel to a respective selected one of said optical outputs; and wherein the switch further comprises: a matched spatial filter in an optical path between at least one optical input port and one or more of said optical output ports, wherein said matched spatial filter imparts a lock phase pattern; an optical data reader to read key phase pattern data from said WDM input optical signal; and a driver coupled to said input to drive said SLM, responsive to said key phase pattern data, to display said array of sub-holograms in combination with a key phase pattern which complements a phase pattern of said lock phase pattern to compensate for said matched filter.

In some preferred embodiments the optical data reader decodes a header of an optical data packet to extract the key phase pattern data. In embodiments this data may be provided in each WDM channel in combination with data which defines a path for routing that WDM channel. Thus in embodiments the header of an optical data packet for each WDM channel may include both the key (for "unlocking" the switch), and data defining the output port of the switch to which that particular channel is to be routed. In general, but essentially, the key phase pattern comprises an inverse phase pattern of the lock phase pattern.

In some embodiments the matched filter may be a static matched filter, for example a static wavefront modifying optical element. Alternatively the matched spatial filter may comprise a further spatial light modulator to implement a dynamic matched spatial filter. In this latter case the particular lock phase pattern on the further SLM may be changed at intervals for increased security.

As the skilled person will appreciate the one or more SLMs may be transmissive or reflective and may be implemented, for example, using LCOS technology.

In a related aspect the invention provides a method of securely routing a wavelength division multiplexed (WDM) signal, the method comprising: encoding a key phase pattern into data carried by a WDM signal; inputting said WDM signal providing said WDM signal to optical WDM signal routing apparatus, the apparatus including a spatial light modulator (SLM) for displaying one or more holograms for steering one or more components of said WDM signal, and a matched spatial filter imparting a lock phase pattern on said WDM signal; and routing said WDM signal through said signal routing apparatus to an output of said apparatus via said matched spatial filter; wherein said routing further comprises: decoding said key phase pattern from said WDM signal; and imposing said key phase pattern on said SLM in combination with said one or more holograms; steering said one or more components of said WDM signal by illuminating said SLM displaying said key phase pattern in combination with said one or more holograms such that said displayed key phase pattern compensates for said lock phase pattern of said spatial matched filter.

Wavelength Selective Switches

We describe, in a co-pending UK patent application filed on the same day as this application, a wavelength division multiplexed (WDM) reconfigurable optical switch and other related WDM systems and methods, with which embodiments of the above described invention may advantageously be employed.

Thus we also describe a WDM switch comprising: a set of arrays of optical beam connections, each comprising an array of optical outputs and having an optical input to receive a WDM input optical signal; a first diffractive element to demultiplex said WDM input optical signal into a plurality of demultiplexed optical input beams, and to disperse said demultiplexed optical input beams spatially along a first axis; first relay optics between said set of arrays of optical beam connections and said first diffractive element; and a reconfigurable holographic array comprising a 2D array of reconfigurable sub-holograms defining sub-hologram rows and columns; wherein said arrays of said set of arrays are at least one dimensional arrays extending spatially in a direction parallel to said first axis and arranged in a column defining a second axis orthogonal to said first axis; wherein said sub-hologram rows are aligned along said first axis, and wherein said sub-hologram columns are aligned along said second axis; wherein a number of said sub-hologram rows corresponds to a number of arrays in said set of arrays; and wherein each sub-hologram row is configured to receive a set of demultiplexed optical input beams at different carrier wavelengths demultiplexed from the optical input for the array of the set of arrays to which the row corresponds; wherein each of said sub-holograms in a sub-hologram row is reconfigurable to steer a respective wavelength channel of the WDM input signal for the array to which the sub-hologram row corresponds, towards a selected said optical output for the array; and wherein each said sub-hologram row is configured to steer the demultiplexed optical input beams for a respective array of the set of arrays of optical beam connections.

Embodiments of such an arrangement can substantially increase the data handling capacity of an optical switch. Although tiling a spatial light modulator (SLM) with a 2D array of relatively small holograms might appear to result in a loss of resolution in the output image plane, in fact the resolution can effectively be maintained if the spacing of the points in the output image plane is relatively smaller—that is, if in embodiments, the optical outputs are relatively close together. In general it is preferable though not essential to include further measures to reduce crosstalk, and we describe later techniques by which crosstalk can be mitigated.

In embodiments the arrays of optical outputs are at least one dimensional arrays extending parallel to the first axis (of wavelength dispersion), and a system of this type can, for example, be implemented on a planar or substantially planar optical circuit or substrate. However in preferred embodiments the arrays of optical outputs are 2D arrays (that is, the outputs are arranged over a region extending over in two dimensions), and each of a sub-holograms steers one of the demultiplexed beams in two dimensions towards the selected optical output for the wavelength/array.

In some preferred embodiments the switch has a folded optical configuration—that is the optical path between the inputs and outputs of the arrays includes a reflecting element. Typically this may be provided by employing a reflective SLM for the reconfigurable holographic array, for example an LCOS (liquid crystal on silicon) SLM. In such an arrangement preferably, though not essentially, the optical input of an array is co-planar with the optical outputs of the array, and forms part of, for example, a rectangular, square or hexagonal grid of the array. In other embodiments, however, the switch may be 'unfolded' and a transmissive SLM used for the reconfigurable holographic array. In this latter case a further diffractive element may be provided on the output side of the holographic array, and further relay optics may be employed to couple the output side to the optical outputs of the switch.

In embodiments the input/output (I/O) plane of the switch may be provided by a set of clusters of input/output ports. In embodiments these clustered ports may define a hexagonal array or grid, which is particularly convenient for interfacing to multicore optical fibre, and hence for providing compact, high-density optical signal processing.

In broad terms each array of I/O ports maps onto a row of the reconfigurable holographic array, each row performing 2D steering for one of the arrays of the set of arrays. More particularly this may be achieved by using the diffractive element to provide dispersion along a row, so that the different wavelengths of the WDM signals are each provided to a separate sub-hologram. A sub-hologram may then display a grating appropriate to the wavelength and to the 2D direction in which the (de-multiplexed) beam is to be steered. As the skilled person will appreciate, in embodiments the sub-holograms of the array may be determined by notionally subdividing a relatively high resolution SLM into sub-holograms by displaying an appropriate phase pattern on each region of n by m pixels. With such an approach the size/shape of a sub-hologram may be flexible, for example depending upon the bandwidth or data rate associated with a particular wavelength channel. For example within, say, C-band, a particular channel may be allocated twice the usual data rate and twice the usual bandwidth, in which case the sub-hologram associated with that wavelength/channel may have twice the width (along the direction of a row). In this way the optical configuration we describe enables the switch to be adaptive to the particular data rates used on the channel.

As the skilled person will appreciate, modulation of a wavelength channel of the input optical beam will result in a beam with an elongate shape when the multiplexed signal is demultiplexed by the diffractive element. The cross-section of a de-multiplexed beam is thus elongated, in particular with a long axis lying along the above described first axis. Thus in embodiments the steering, in preferred embodiments in two dimensions, comprises deflecting such a demultiplexed optical input beam in a direction parallel to this axis (as well as orthogonal to this axis, depending upon the particular direction needed for the selected optical output).

In embodiments the SLM employed may be a high-resolution LCOS SLM, for example having a resolution of one to a few thousand pixels (or higher) in each direction. Individual sub-holograms may, however, be relatively small, for example of order 50×50 pixels say, in the range 20 to 200 pixels on each side (in embodiments the sub-holograms may be substantially square in terms of pixel count and/or physical dimensions). In embodiments a sub-hologram pixel may be able to display, 64, 128 or more phase levels. In preferred embodiments of the systems described herein the hologram is a phase hologram or kinoform.

In some embodiments of the switch the relay optics may include non-telecentric optics such that output beams from the holographic array, as they propagate towards the output arrays, define directions which diverge away from an optical axis of the switch. Thus in some embodiments of the optical switch the optical input of an array defines an input axis and a steered output beam from the relay optics, directed towards an optical output of the array, has an axis which diverges away from this input axis (in a direction of light propagation from the optical output). Thus in broad terms in such embodiments the output beams diverge away from an optical axis of the switch. Optionally the optical outputs of an array of optical beam connections may then also have axes which (each) diverge away from the optical axis or, for example, a lens (lenslet) array may be used to couple, more particularly focus, into an array of optical beam connections. In this latter case the lenslets may be offset to direct the output beams to afterwards lie substantially parallel to the optical axis. These techniques can help to reduce crosstalk in the system.

In other embodiments the switch may additionally incorporate telecentric magnification optics to provide the output beams with increased mutual spatial separation. In such embodiments the system may have a virtual output array plane, in particular to provide a virtual image of the set of arrays of optical beam connections. The telecentric magnification optics may then be provided between this virtual output array plane and the actual optical beam connections. Preferably in such an arrangement a further lens or lenslet array is provided between the magnification optics and an array of optical outputs, to couple, more particularly focus, the magnified (and hence more spatially separated) beams into the output array.

In these and other embodiments a lenslet array may also be included prior to the (input/)output ports (fibre array) in the optical path to compensate for varying beam diffraction angles (angles $\varphi(\theta'(p))$ later). Where output to fibre array is employed (the output ports comprise or consist of a fibre array), in particular where the fibre axes are parallel to the optical axis, for example if a multicore fibre is used, a single lenslet may be provided (fabricated) on the end of each fibre.

Additionally or alternatively the input axis may be tilted with respect to an optical axis of the system, more particularly with respect to an optical axis of the reconfigurable holographic array, so that a zeroth order beam reflected from the holographic array avoids re-entering the optical input. This helps to avoid the need for input port isolation (to mitigate back-reflections). In embodiments where the optical input is part of the same array as the optical outputs, typically the case for a reflective SLM/folded optical system, the optical input may be offset from the centre of the array. Then, in embodiments, the zeroth order beam may be dumped, for example into an unused optical output, which may be at the centre of the array.

As previously described, in some preferred implementations each sub-hologram defines a phase grating, configured to direct light of the wavelength band selected by the position of the sub-hologram in its row towards a selected optical output of the array of optical outputs. Thus in preferred embodiments the system includes a driver coupled to the SLM to drive the SLM with an appropriate set of sub-holograms according to the selected outputs for the various different wavelength components of the inputs. Since a relatively small number of holograms/gratings is needed, optionally these may be pre-calculated and corresponding phase data stored in non-volatile memory, so that a particular hologram/grating may be selected as needed. In embodiments the driver includes a processor to receive switch control data defining which wavelengths are to go to which outputs, and the processor then selects holograms for display accordingly. Such a processor may be implemented in software, or in hardware (for example as a gate array or ASIC), or in a combination of the two.

Although the individual sub-holograms may in principle be simple gratings, optionally they may also incorporate phase information for wavefront modification/correction. For example optical distortion within the switch could be measured (either for a reference device or for each individual device) and at least partially corrected in the displayed hologram data. Crosstalk may be mitigated in a similar manner. Additionally or alternatively crosstalk may be reduced by the techniques we have previously described in WO2012/123715 (hereby incorporated by reference in its entirety). In broad terms the switch may deliberately incorporate a "distorting" optical element, for example an element which provides defocus (say an axicon). Then this distortion or defocus may be corrected in a displayed sub-hologram so that a particular, selected diffraction order (such as +1 or −1) is corrected, to reduce the coupling of one or more other unwanted diffraction orders into an optical output other than the selected optical output (which can otherwise be a particular problem where the outputs are regularly spaced).

Embodiments of the above described system can be employed to direct a selected wavelength of a WDM signal to a selected optical output of the switch. In this regard it may be thought of as a form of demultiplexer. In a corresponding manner the optical paths through the device may be reversed so that the switch can operate as a multiplexer or combiner.

Thus in a complementary aspect the invention provides a reconfigurable optical switch, the switch comprising: a set of arrays of optical beam connections, each having an optical output to provide a WDM output optical signal and comprising an array of optical inputs, each to receive an input beam of a different centre wavelength; a first diffractive element to disperse input beams from said set of arrays spatially along a first axis; first relay optic between said set of arrays of optical beam connections and said first diffractive element; a reconfigurable holographic array comprising an array of reconfigurable sub-holograms defining sub-hologram rows and columns; wherein said arrays of said set of arrays are at least one dimensional arrays extending spatially in a direction parallel to said first axis and arranged in a column defining a second axis orthogonal to said first axis; wherein said each sub-hologram rows are aligned along said first axis, and wherein said sub-hologram columns are aligned along said second axis; wherein a number of said sub-hologram rows corresponds to a number of arrays in said set of arrays; wherein each sub-hologram row is configured to receive said dispersed input beams from one of said arrays of optical inputs; and wherein each of said sub-holograms in a sub-hologram row is reconfigurable to steer a respective input beam, in one or preferably two dimensions, towards the optical output of the array to which the sub-hologram row corresponds.

Again the switch (multiplexer or combiner) preferably has a folded configuration, for example employing a reflective SLM to display the reconfigurable holographic array. However the skilled person will appreciate that it may equally be operated in an unfolded configuration, for example using a transmissive SLM.

In a similar manner to that previously described, each incoming wavelength from each array of inputs has its own sub-hologram which is configured to steer that wavelength, from the particular input to the common output for the array (which may or may not be a central output, as previously described).

A WDM reconfigurable optical switch with multiple arrays of optical outputs may be combined with a multiplexer/combiner as previously described to provide what is here referred to as an optical router. This, in embodiments, enables any wavelength at any input to be routed to any selected output.

This can be achieved, in broad terms, by connecting each optical output of each array from the switch to each optical input of each array of the multiplexer/combiner. Thus the switch can then be used to direct a selected wavelength to a selected output of the router by choosing the optical output of the switch to which it is directed. The coupling between the switch and the multiplexer combiner involves connecting each output of each array from the switch to each input of each array of the multiplexer/combiner, and this may be done in a number of different ways. For example in one approach a network of fibre optic connections is used, which may be referred to as a 'fibre shuffle network'. Alternatively the connections may be made using fibres or free-space optics. In a yet further approach the optical outputs may be arranged so that they are all substantially planar, and the connections made using a planar 'lightwave circuit'.

In a related aspect, therefore, the invention provides a WDM reconfigurable optical router comprising a WDM reconfigurable optical switch as described above, and additionally: a second set of arrays of optical beam connections, each having an optical output to provide a WDM output optical signal and comprising an array of optical inputs; wherein each optical input of said second set of arrays is optically coupled to an optical output of said set of arrays of said switch; a second diffractive element to disperse input beams from said second set of arrays spatially along a third axis; second relay optics between said second set of arrays of optical beam connections and said second diffractive element; a second reconfigurable holographic array comprising an array, preferably a 2D array, of reconfigurable sub-holograms defining second sub-holograms rows and columns; wherein said second sub-hologram rows are aligned along said third axis and wherein each second sub-hologram row is configured to receive said dispersed input beams from one of said second set of arrays; and wherein each of said sub-holograms is a second sub-hologram row is reconfigurable to steer, preferably but not essentially in two dimensions, a respective input beam towards the optical output of an array of the second set of arrays to which the second sub-hologram row corresponds.

The invention also provides a method of switching a set of wavelength division multiplexed (WDM) optical signals, the method comprising: providing a set of optical port arrays each comprising an input port to receive a WDM optical input and a set of output ports; wherein said port arrays are spatially dispersed along a second axis and said output ports of said port arrays extend at least along a first axis orthogonal to said second axis; providing light from said input ports of said port arrays to a diffractive element to disperse wavelengths of said WDM optical signals along said first axis orthogonal to said second axis to demultiplex said WDM optical signals; providing said demultiplexed optical signals to a reconfigurable holographic array comprising a 2D array of reconfigurable sub-holograms defining sub-hologram rows aligned with said first axis and sub-hologram columns aligned with said second axis such that each sub-hologram row corresponds to a said port array; and steering said demultiplexed optical signals using said reconfigurable holographic array such that each row of sub-holograms steers a set of demultiplexed wavelengths from a said array input port to a set of selected output ports of the array, and such that a set of said rows of the reconfigurable holographic array steers the demultiplexed wavelengths of said set of port arrays.

Again as previously described, in some preferred embodiments the fibre arrays, more particular the output ports of the fibre arrays, extend in two dimensions, that is along each of the first and second axes, and the sub-holograms steer the demultiplexed optical signals in two dimensions towards the selected output ports. However in other embodiments a fibre array, more particularly a set of output ports of a fibre array, may only extend along the first axis, that is in a direction of wavelength dispersion by the diffractive element, and the sub-holograms may then steer the demultiplexed optical signals by deflecting the demultiplexed beams parallel to this direction, more particularly deflecting the beams in a plane comprising this direction. Embodiments of this latter type may be useful, for example, for implementation on a substantially planar substrate.

As previously described, in some embodiments of the method optical axes of the output beams (or ports/fibres) may be tilted with respect to an optical axes of the input port of the fibre or other arrays (although each array may still share a lenslet). In embodiments this helps to reduce crosstalk and to increase diffraction efficiency. Additionally or alternatively in embodiments the input port may be offset from a centre of an array. Then a zeroth order reflection from the reconfigurable holographic array may be captured or dumped, for example in an unused output port of the array. These techniques generally facilitate the use of an array of sub-holograms, which tend to have a reduced range of angular deflection resulting in a more tightly packed holographic replay field.

In some embodiments the output ports of an array are arranged in a hexagonal close-packed configuration, which again facilitates efficient operation, as well as convenient coupling to a multicore fibre.

Again as previously described the number of sub-holograms in a row may be adapted, in embodiments in real time, to the bandwidth(s) of the signals within the WDM optical signal. Optionally, again, suitably sized sub-holograms may be precalculated and stored in non-volatile memory. In general steering using the reconfigurable holographic array comprises defining a set of gratings, more particularly phase gratings, on a spatial light modulator, preferably a reflective SLM such as an LCOS SLM. Typically a single grating is displayed for each sub-hologram.

As previously described, the method may be used 'in reverse' so that the input port of an array becomes an output port and so that the output ports become input ports, to provide a method of multiplexing or combining optical signals. This method may then be concatenated with the method switching optical signals described above, by connecting each output port to a respective input port of the next stage. This combination may then be employed as a method of N by N routing of N optical signals each with a plurality (C) of different wavelengths, where C may but need not necessarily equal N.

Thus in embodiments the above described method further comprises providing a second set of optical port arrays, each comprising an output port and a set of input ports, wherein said second set of optical port arrays is spatially dispersed along a fourth axis; coupling each set of output ports of said set of port arrays to said input ports of said second set of port arrays; providing light from said input ports of said second set of port arrays to a diffractive element to provide dispersion along a third axis orthogonal to said fourth axis; providing said dispersed light from said input ports of said second set of port arrays to a second reconfigurable holographic array comprising a 2D array of reconfigurable sub-holograms defining sub-holograms rows aligned with said third axis and sub-hologram columns aligned with said fourth axis; and steering the dispersed light from each input port of a port array of the second set of port arrays, in two dimensions using said second reconfigurable holographic array, towards the output port for the port array.

The skilled person will appreciate that the features of embodiments of the initially described WDM switch/router may also be correspondingly incorporated into the later described aspects of the invention, including the above-described methods.

BRIEF DESCRIPTION OF THE DRAWINGS

These and other aspects of the invention will now be further described, by way of example only, with reference to the accompanying figures in which:

FIGS. 20a and 20b shows geometry and variables used in mathematical analysis of a fractional Fourier transform system that has a non-planar wavefront incident on the device used to display the kinoform.

DETAILED DESCRIPTION OF PREFERRED EMBODIMENTS

We first describe some examples of WDM switches, to provide context useful for understanding, and in the context of which embodiments of the invention can provide useful advantages.

Figure 1A:
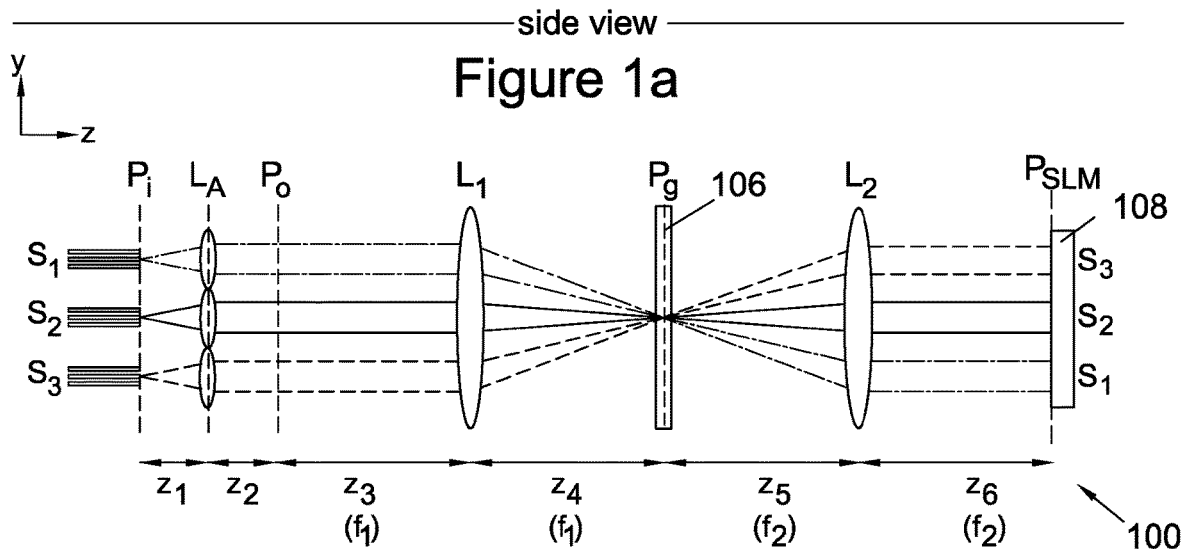
FIGS. 1a to 1d illustrate an embodiment of a wavelength division multiplexed (WDM) reconfigurable optical switch according to the invention illustrating, respectively, a side view of the switch, a top view of the switch, an array of input/output ports for the switch, and an illustration of the disposition of a 2D array of reconfigurable sub-holograms for the switch.
Figure 1B:
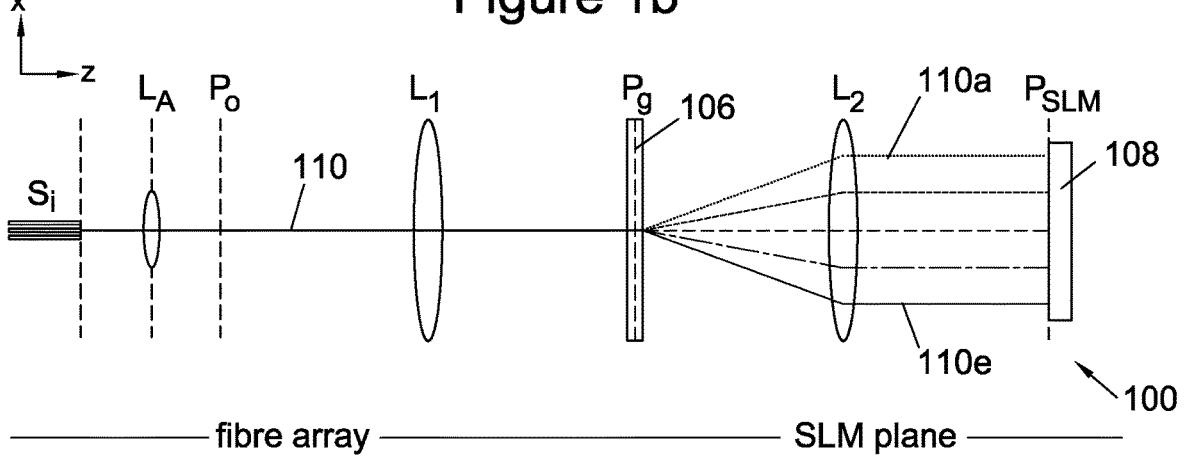
Figures 1C, 1D:
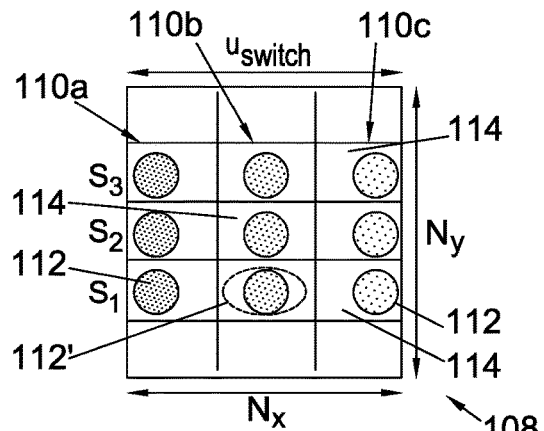
Figure 2:
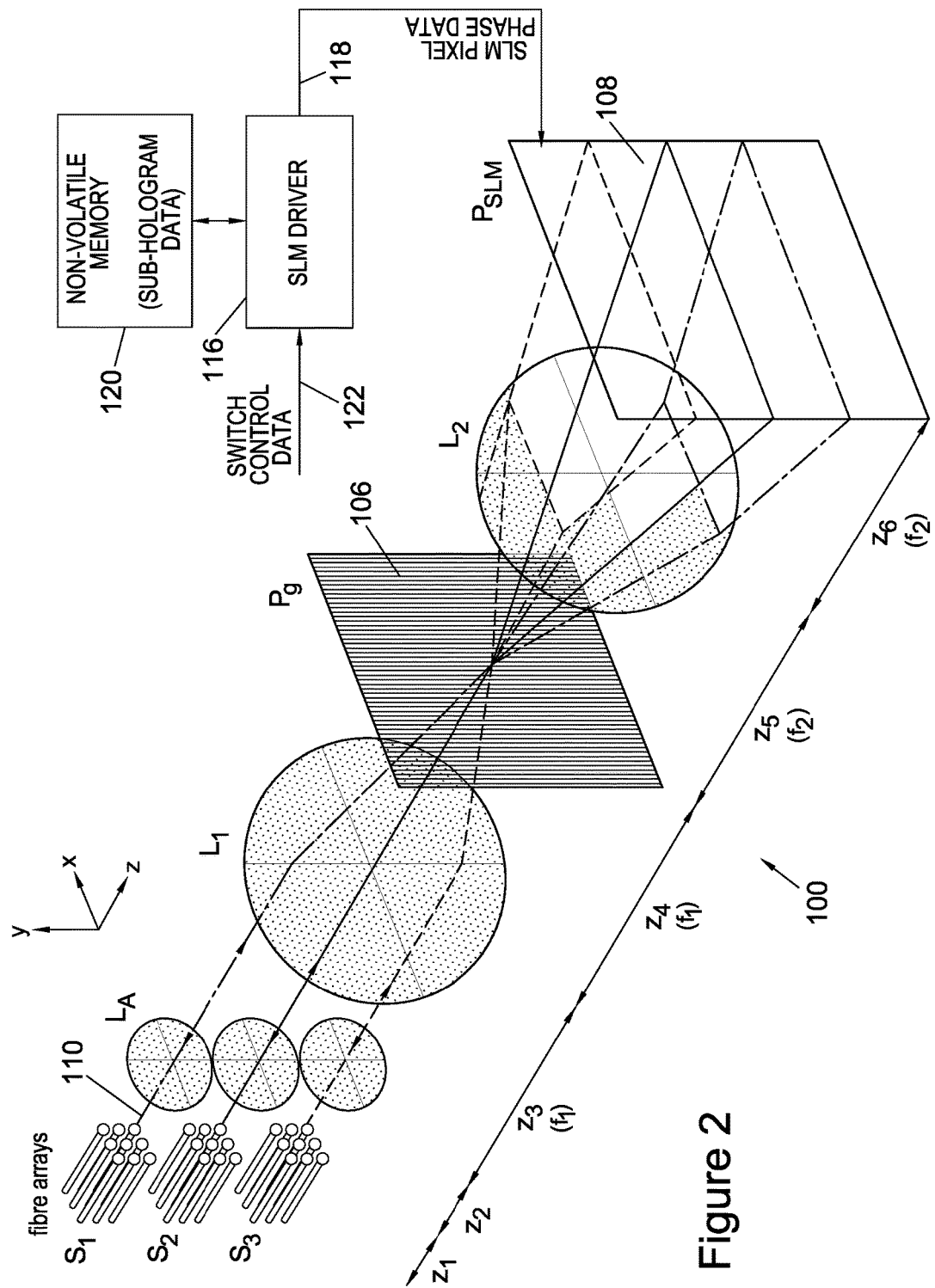
FIG. 2 shows a perspective view of the switch of FIG. 1, showing an array of stacked 1×N wavelength selective switches (WSSs)

Thus referring to FIGS. 1 and 2, this shows a WDM reconfigurable optical switch 100 according to an embodiment of the invention. As illustrated the switch comprises a set of M arrays of input/output ports $S_1 \ldots S_3$, of which three are shown in the figure. In the illustrated embodiment each array of ports comprises a fibre array as shown in FIG. 1c. Each array comprises an input (fibre) 102 and a set of outputs (fibres) 104, in the illustrated example on a regular square grid with spacing $Y_f$ (although in other embodiments a rectangular or hexagonal grid may be employed). As illustrated the array comprising the output fibres 104 also includes the input fibre 102, but it will be appreciated that the arrangement of FIG. 1 may be unfolded to have the input at one end and the outputs at the other end of the switch. In the illustrated example each array $S_i$ is a 3×3 array with one input and eight outputs, to therefore implement a 1×8 or 8×1 wavelength selective switch (WSS)—although it will be appreciated that other numbers of input/output ports may be employed.

As illustrated in FIG. 1 preferably, though not essentially, the fibre arrays $S_1$, $S_2$ and $S_3$ are regularly (uniformly) spaced in the y-direction; in the illustrated example M=3. In the illustrated embodiment the input and output ports lie in a common plane P. Again this is convenient but not essential since, for example, the holograms displayed on the spatial light modulator (described later) may incorporate focussing power. Thus in other arrangements, for example, the ports may be staggered in the z-direction and a displayed sub-hologram may incorporate focusing power to focus an output beam on a selected output port—which may be helpful to mitigate crosstalk.

An array of M objective lenses $L_A$ is provided on the same pitch as the input/output port arrays. These may be provided by a lenslet array. In embodiments these lenses each have substantially the same focal length $F_A$, but again this is not essential. In embodiments light from an input port 102 of, for example, a cluster of fibres is collimated by the corresponding objective lenslet of array $L_A$ at plane $P_0$. Thus, for example, an objective lenslet may expand the input mode field radius from, say, around 5 μm to around 50 μm beam waist, to cover a useful area of a sub-hologram for efficient diffraction. In FIG. 1 the terms $z_1$ and $z_2$ are the distance from the fibre array to the lenslet array, and the distance from the lenslet array to plane $P_o$ respectively, and plane $P_o$ is the plane at which the relay system images the SLM plane.

In the illustrated embodiment the system includes relay optics $L_1$, $L_2$ to either side of a grating 106 (at plane $P_g$), to image plane $P_0$ at the plane of a spatial light modulator (SLM) 108, $P_{SLM}$), and vice versa. As illustrated lenses $L_1$, $L_2$ comprise a 4f relay system which images plane $P_0$ onto the SLM via a static diffractive element 106. In the illustrated embodiment this comprises a static grating which demultiplexes the WDM input signals into a plurality of demultiplexed wavelengths, spectrally dispersing the input wavelengths across the SLM plane in the x-direction. This is illustrated in FIG. 1b where an input beam 110 is demultiplexed into a set of beams 110a-110e at different wavelengths, which illuminate separate sub-holograms on SLM 108 that independently steer each beam angularly in two dimensions.

In embodiments the SLM 108 is a reflective LCOS (liquid crystal on silicon) SLM with M rows of sub-holograms, one for each of the input/output port arrays $S_1$—that is one for each of the stacked wavelength selective switches associated with a respective input/output port array. Thus FIG. 1a shows a set of 3 stacked WSSs in which the bottom row of the SLM displays sub-holograms for $S_1$ and in which the top row of the SLM displays sub-holograms for $S_3$. FIG. 1d illustrates the SLM plane, showing dispersion of light from each of the input ports in the x-direction, and switching for each I/O array implemented by separate rows in the y-direction. Each circular region 112 illustrates a demultiplexed beam from one of the I/O arrays, which illuminates a corresponding region on SLM 108 displaying a sub-hologram to deflect the beam to a selected output port. As illustrated in FIG. 1d regions 112 are spatially separated from one another, to reduce beam overlap and are shown as having sharp edges merely for the purposes of the illustration (in practice the beam intensity will diminish somewhat gradually away from the centre of the beam). FIG. 1d also illustrates, schematically, sub-holograms 114 displayed on the SLM. In embodiments these sub-holograms may tile the SLM with substantially no gaps in between. In embodiments, (unlike the illustration) the sub-holograms may be substantially square in terms of numbers of pixels in the x- and y-directions and/or physical dimensions. More particularly, whether or not a sub-hologram region is square, in embodiments a beam impinging upon a sub-hologram has an intensity profile cross section with square symmetry.

As illustrated the demultiplexed beams 112 are shown as circular but, as the skilled person will appreciate, such a beam is modulated with data, the modulation expanding the range of wavelengths occupied by the beam. Thus a modulated beam will, in practice, be elongated in the x-direction (that is along the axis of dispersion), as schematically illustrated by profile 112'. As illustrated in FIG. 1d each demultiplexed optical channel has substantially the same bandwidth. However because the arrangement of the sub-holograms displayed on the SLM 108 is not physically constrained but is merely defined by the displayed phase data the switch may adapt to different bandwidths of the demultiplexed optical beams. This may be done by using a suitable width (in the x-direction) for a sub-hologram deflecting the beam, that is a width which matches the bandwidth of the beam. In one approach, for example, two or more regions allocated to adjacent sub-holograms in a row may be combined to display a single sub-hologram where one beam has ×2 (or ×3 or more) of the bandwidth of another beam. Thus each wavelength from each I/O array has its own respective sub-hologram displayed on SLM 108.

Referring to FIG. 2, SLM 108 may be driven by an SLM driver 116 which provides SLM data on line 118 for display, typically data defining phase levels of the pixels for displaying a plurality of kinoforms on the sub-hologram. In embodiments a sub-hologram for a wavelength may comprise a phase grating, preferably a blazed grating, in a manner well known to those skilled in the art.

Such holograms may, for example, be pre-calculated and stored in non-volatile memory 120 coupled to driver 116. Thus when the driver receives a control signal for the switch on line 122, to direct an input of array $S_i$ at a specific wavelength to a selected output, the appropriate stored sub-hologram may be selected from memory 120 for display at the position along a row corresponding to the selected wavelength. Alternatively grating data may be calculated as needed, for example using (inverse) Fourier transform hardware to calculate the grating from an inverse Fourier transform of the target diffracted spot (output beam location).

In a variant of the above-described approach an input beam may be multi-cast to multiple selected outputs simultaneously. In one approach this can be achieved simply by adding the holograms (that is adding the respective phases at each pixel location) for each selected output and displaying the combined result.

Continuing to refer to FIGS. 1 and 2, the light diffracted from the SLM 108 is in a sense re-multiplexed (although different wavelengths are directed to different outputs) and imaged at plane $P_0$ by the relay optics $L_2$, $L_1$, and by the grating 106 at $P_g$. In the example of FIG. 1*a* if, say, $F_1=F_2$ then the wavefront leaving the SLM will (in an ideal system) be replicated at $P_0$. Referring to FIG. 1*d*, a demultiplexed beam may be steered in the x-direction (that is parallel to the axis of dispersion) and in the y-direction. The diffraction grating 106 effectively re-multiplexes the beams, and any angular displacement imposed on a beam by a sub-hologram displayed on the SLM is converted into a positional displacement at the lenslet array $L_A$. The angularly steered beams (now with a positional displacement) are focussed by corresponding lenslets in $L_A$ into a selected output port 104. Beam steering may be achieved by adjusting the period of the displayed blazed grating of a sub-hologram. In principle the lenslet array $L_A$ could be omitted but is included for coupling efficiency and system compactness.

In broad terms embodiments of the system has an input/output plane at a front focal plane of the relay optics ($L_1$, $P_g$, $L_2$) and an SLM at the back focal plane of the relay optics. However the system is configured to demultiplex WDM beams and, in effect, to spatially multiplex a group of wavelength selective switches in a direction (the y-direction) perpendicular to the direction of wavelength dispersion in the system. Thus because each I/O port array, for example each 3×3 fibre cluster, is located at a different lateral position in the y-direction, on passing through the relay lenses $L_1$ and $L_2$ and the demultiplexing grating 106 the input signals from the M (1×8) WSS input ports are dispersed in the x-direction. Moreover the input signals from the M (1×8) WSS input ports and will also be imaged at different lateral positions in the y-direction, and as a result independent rows of sub-holograms can be used to control the signal routing for each of the M switches. As shown in FIGS. 1 and 2, in embodiments the light is inverted by the 4f relay optics. (Although lenses are preferable as they provide more degrees of freedom to optimize the imaging performance of the relay system, the relay may also be implemented using mirrors).

Thus embodiments of the switch implement M individual wavelength selective switches (in the illustrated example, 1×8 switches) using a common relay system ($L_1$, $L_2$), a common demultiplexing grating 106 ($P_g$), an SLM 108, an array of M objective lenses ($L_A$), and a set of M (for example 3×3) input/output ports or fibre arrays spaced along the y-axis of the system.

We have described the switch 100 as a switch which, for each WSS, routes an input port to one (or more) selected output(s). However the skilled person will appreciate that the optical paths shown in FIGS. 1 and 2 are reversible, and thus essentially the same system may be used as a stacked set of N×1, in the illustrated embodiment 8×1, wavelength selective switches. For example a 1×8 WSS may route $\lambda_1$ and $\lambda_2$ from the central input port to output ports 2 and 4 respectively. However if one reverses the propagation of light through the system so that there are (in this example) 8 input ports and one centrally located output port, both $\lambda_1$ from port 2 and $\lambda_2$ from port 4 will be routed to the same central output port without having to change the sub-hologram phase patterns $\lambda_1$ and $\lambda_2$. Thus as long as there is no signal contention (two wavelengths of the same value entering the same WSS of the switch via different input ports), one can implement a set of N×1 wavelength selective switches.

Extending this concept, two WDM reconfigurable optical switches, each as shown in FIGS. 1 and 2, may be combined back-to-back to provide an N×N wavelength selective switch. In particular this may be achieved by connecting each output of each WSS array from the first switch to an input of each WSS of the second switch. That is, for example, a first WSS of the first switch has outputs which are connected to an input of each of the WSSs of the second switch (output one to WSS 1 of the second switch, output 2 to WSS 2 of the second switch and so forth); and each of the WSSs of the first switch is connected in this way. The optical connections may be made in any convenient manner.

Figure 3:
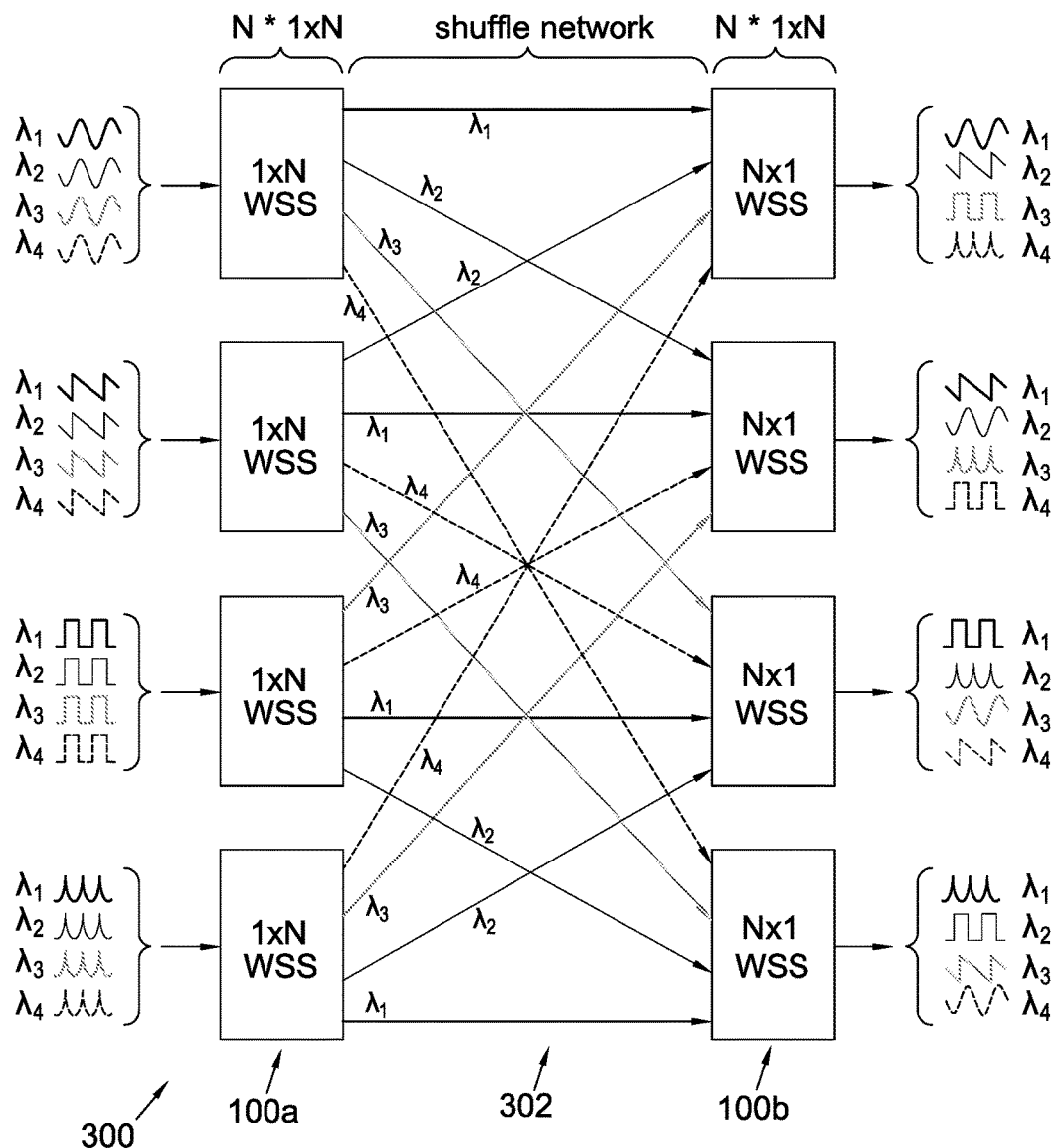
FIG. 3 shows a WDM reconfigurable optical router comprising a pair of connected switches each of the type shown in FIGS. 1 and 2, illustrating an example interconnection pattern for a N×N WSS comprising an array of input and output 1×N WSSs and a static shuffle network where example N=4, wherein the switch can be reconfigured to route any wavelength from any input port to any output port, and is contentionless.

Thus referring to FIG. 3, this shows an embodiment of an N×N wavelength selective switch or optical router 300 comprising first and second WDM reconfigurable optical switches 100*a*, 100*b*, each as previously described, connected back-to-back by a set of optical connections 302, to implement a non-blocking WSS router. The set of connections 302 may be referred to as a shuffle network ($N^2 \times N^2$), more particularly a static shuffle network, and may be implemented, for example by one or more of: a fibre shuffle network connected to the 1×N output ports and N×1 input ports; free space optics; or a planar lightwave circuit, which may include additional functionality, for example channel monitoring for active alignment. For example in embodiments a commercially available fibre shuffle network may be employed comprising individual single mode fibres laminated to a flexible substrate for mechanical rigidity, typically with the inputs and outputs are separately connectorized.

The example of FIG. 3 shows wavelength selective switches where N=4 (and uses a 16×16 shuffle network), and where the respective wavelengths are labelled $\lambda_1$ to $\lambda_4$: as can be seen the router can be reconfigured to route any wavelength from any input port to any output port. Embodiments of such a system are therefore contentionless.

In the example of FIG. 3 only four wavelengths are shown for simplicity but in practice one would use an N×N WSS with N input ports and N output ports in which each port may support C wavelength channels, where in principle C may be any number greater than 2. For example, in the case of the 4×4 WSS shown in FIG. 3, each individual input and output port might carry up to 80 signals with 50 GHz channel separation across the C-band—that is C=80. The skilled person will also appreciate that, as previously mentioned, in embodiments channels may be of variable width (wavelength range) so that, for example, a pair of adjacent channels might be combined. In such an arrangement C is variable.

The skilled person will appreciate that a routing system of the type illustrated in FIG. 3 may potentially be implemented with multiple front end switches and multiple back end switches—for example with a switch arrangement where N=4 two front-end and two back-end switches may be employed to provide an 8×8 non-blocking WDM optical router.

WSS Examples

We will now describe in more detail liquid crystal on silicon (LCOS) based wavelength selective switches (WSSs), more particularly the design of a stacked 1×N WSS module. Here, for example, a 1×N WSS has one input port and N output ports and an N×1 WSS has N input ports and one output port, and is a 1×N WSS used in reverse. An LCOS SLM is used by way of example—the designs can also be implemented using a transmissive SLM.

Basic Operation of a 1×N WSS

Figure 4A:
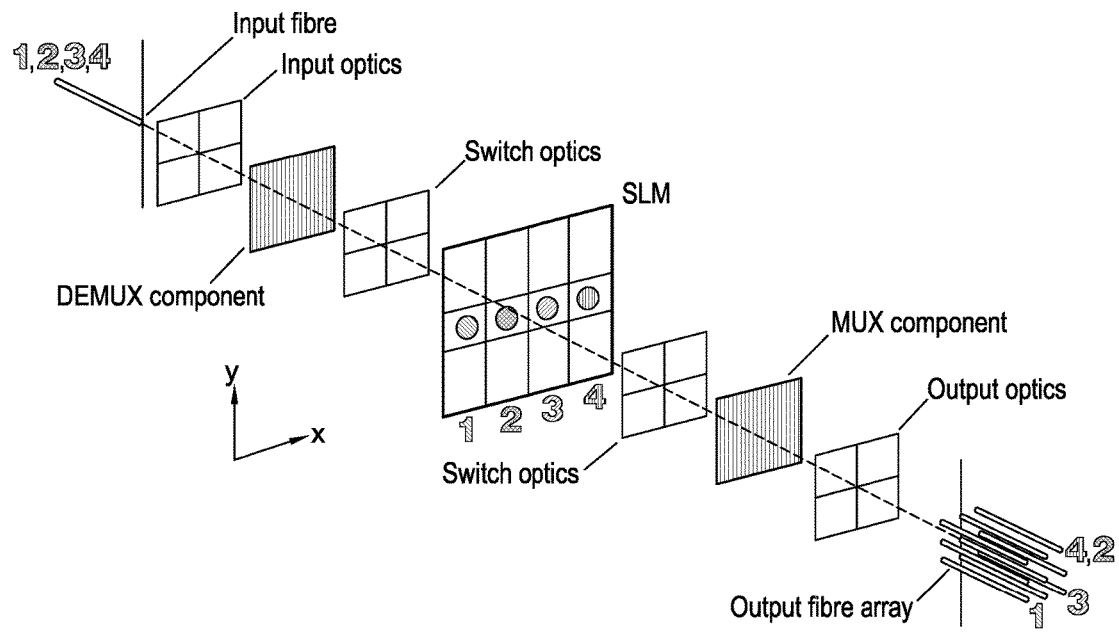
FIGS. 4a to 4c show, respectively, a functional outline of a 1×N switch based on the use of square sub-holograms at the LCOS SLM plane illustrating four signal channels being routed to four output fibres; a functional outline of a 1×N switch with elongated beams at the LCOS SLM plane illustrating four signal channels being routed to four output fibres; and an outline of an example N×M wavelength selective switch based on two LCOS switch planes where N=M=4 and each input port carries four wavelength channels.

FIG. 4a illustrates the functional optical layout of a generic 1×N WSSs, dispersing WDM wavelength channels across a LCOS phase modulating device, and using gratings to steer the signal beams to specific output fibres.

The switch comprises:
1) An input fibre.
2) Input optics, which may include polarization diversity components, and components to transform the Gaussian beam radius of the input beams to one matching the LCOS SLM sub-holograms.
3) A DEMUX component.
4) Switch optics that directs the de-multiplexed beams onto the LCOS SLM.
5) A LCOS SLM displaying an array of sub-holograms.
6) Switch optics that directs the steered beams to a MUX component.
7) A MUX component to angularly recombine the data channels.
8) Output optics, which may include polarization diversity components, and components to transform the data channels to optical modes that match the output fibre mode characteristics.
9) An output array of N output fibres.

It should be noted that, in practice, the LCOS SLM operates in reflection due to the fact that a silicon chip is used to implement the array of individually addressable electrodes that make spatial phase modulation possible. As a result, the switch is typically folded back on itself. Thus the input fibre and output fibre array are in embodiments fabricated as a single component. Similarly, in embodiments a single grating operates as both the DEMUX and MUX component, as does the input and output switch optics. This is also true for the input and output optics.

In operation:
1) Data enters the switch via a single input fibre (denoted 1, 2, 3, and 4 in this example).
1) A DEMUX component, which is typically a diffraction grating, angularly separates the data channels.
2) The switch input optics converts the light associated with each data channel into a series spatially separated Gaussian beams at the LCOS SLM plane. A corresponding series of independent sub-holograms then angularly steer the beam in two dimensions. This may be achieved by displaying quantized blazed phase gratings.
3) The steering angle is a function of both grating period and pixel size. However, in the case of a blazed grating we aim to keep the minimum number of pixels per period, $p_{min}$, greater than eight pixels in order to maximize diffraction efficiency.
4) The switch output optics directs the diffracted beams to the MUX grating whilst maintaining an angle of deflection in the xy-plane as imparted by the blazed gratings.
5) The MUX component angularly re-multiplexes the signal beams so that they effectively align whilst maintaining the angle of deflection in the xy-plane as imparted by the blazed gratings.
6) The output optics then converts these deflection angles to spatial offsets in the xy-plane. In addition, the output optics ensure that the data channels couple efficiently into the correct output fibre.

The same optical configuration shown in FIG. 4a can also be used as an N×1 WSS. To explain this, we consider the reversibility of optics. For example, as a 1×N WSS we may route $\lambda_1$ and $\lambda_2$ from the central input port to output ports 2 and 4 respectively. If we reverse the propagation of light through system so that we have eight input ports and one centrally located output port, both $\lambda_1$ from port 2 and $\lambda_2$ from port 4 will be routed to the same central output port without having to change the sub-hologram phase patterns. Thus, as long as there is no signal contention (two wavelengths of the same value entering the switch via different input ports), we can implement an N×1 WSS.

1×N WSS Based on Elongated Beams

Figure 4B:
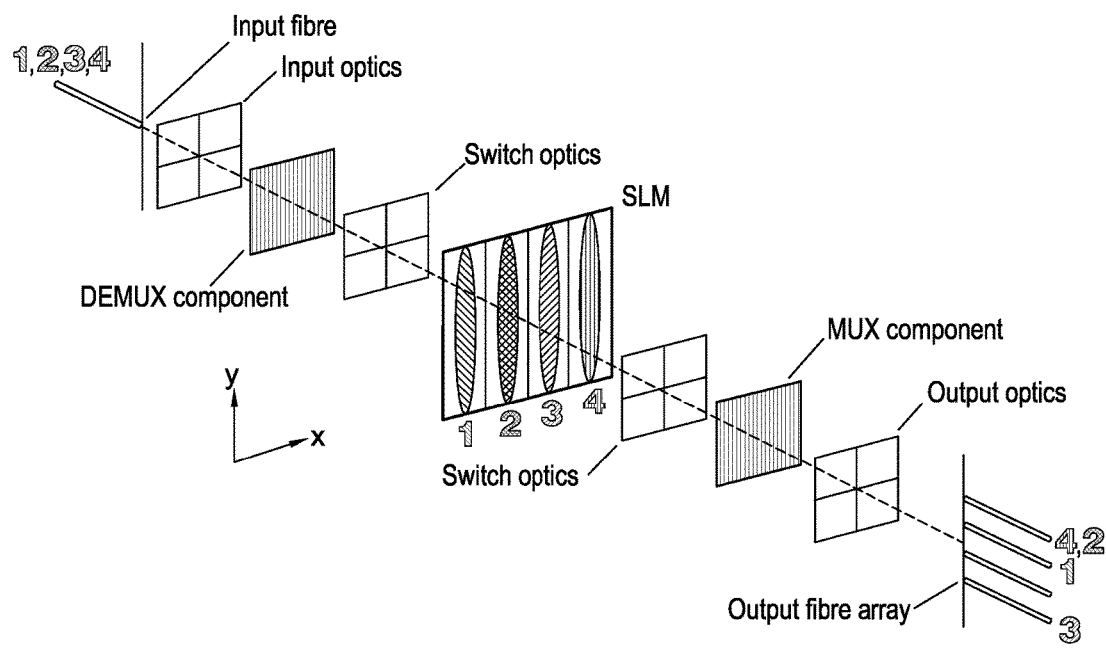

An LCOS based 1×N WSS may be constructed using anamorphic (cylindrical) switch optics to convert the input signals to elongated beams at the LCOS plane, as illustrated in FIG. 4b. In this example the output ports extend along an axis perpendicular to a direction of dispersion. This addresses the following constraints: The limited number of pixels that the current generation of HD and 2K LCOS SLM technology supports; the fact that the most effective DEMUX components are high spatial frequency gratings that disperse the light linearly (i.e., light is dispersed linearly to the x-axis); and passband-related issues: If one changes the wavelength of an unmodulated signal beam from its ideal ITU (International Telecommunications Union) grid value, the insertion loss as it transmits through the WSS will increase as the beam moves away from the centre of the sub-hologram due to clipping and subsequent diffraction effects. In practice due to the finite spectral bandwidth of a modulated data signal, and potential jitter and drift of the central carrier frequency of a specific wavelength channel, this will lead to signal errors. As a result, it is preferable to ensure that the switch design has a sufficient passband, defined as the change in central carrier frequency from its ideal ITU value that results in an increase in insertion loss of 0.5 dB, to minimally affect the data being transmitted through the switch. This sets a minimum ratio of unmodulated signal beam radius to sub-hologram width in the direction of wavelength dispersion.

For example, a 2K LCOS device is comprised of approximately 2K×1K pixels. If this has to support 80 50 GHz ITU channels, one would only be able to allocate approximately 2000/80=25 pixels per sub-hologram in the y-direction, assuming this is the direction of linear dispersion of the DEMUX element. Let us assume that there is a circular Gaussian beam of radius $w_{SLM}$ incident on a square sub-hologram of dimensions $n_x \times n_y$ pixels, where the pixel size is $\Delta \times \Delta$. Such a sub-hologram can steer in both the x and y-directions equally well, with a maximum radial deflection in the xy-plane dependent on the minimum number of pixels per grating period, $p_{min}$, we allow. As mentioned, in practice we set this value as >8 pixels in order to maximize sub-hologram diffraction efficiency.

It can be shown that the number of discretely addressable fibres that can be steered to in a direction parallel the y-axis is given by:

$$q_{max} = 2 \times \text{floor}\left(\frac{\pi}{\alpha_{SLM} \alpha_i} \frac{n_y}{p_{min}}\right) \quad (1)$$

In addition to the terms defined above:

With respect to the switch passband we define a term $\alpha_{SLM} = n_y \Delta / w_{SLM}$. This gives the ratio of the unmodulated Gaussian beam radius at a sub-hologram to the sub-hologram width. This is a key parameter in determining how cleanly transmitting data will be transmitted through the WSS, and through cascaded WSSs. To meet the passband requirements for 50 GHz channel separation, we should set $\alpha_{SLM} \geq 5$. Thus there is a trade-off between passband and steering range.

The term $\alpha_i$ defines the ratio of the spacing between fibres at the output plane, Y, and the Gaussian beam spot size at the output plane, $w_i$. The larger the $\alpha_i$ the more widely separated the output beams. Typically we set $Y/w_i \geq 3$ to minimize crosstalk.

As a result, a circularly symmetric Gaussian beam incident may cover at most 15 pixels at the LCOS SLM plane in both the x and y directions if we are dealing with a 2K LCOS SLM and 80×50 GHz signal channels. Setting $p_{min}=4$, $\alpha_{SLM}=5$, $\alpha_i=3$, and $n_y=25$ results in a value for $q_{max}$ of 2. Thus steering in two dimensions would give a switch capacity of 8 ports assuming the fibres are arranged on a uniform grid. However, due to the low value of $p_{min}$, the switch would have a high insertion loss and crosstalk. Increasing $n_y$ to 50 allows us to double the value of $p_{min}$, and improve performance.

By elongating the sub-holograms along the y-axis, we can increase the number of spatially distinct locations that a sub-hologram can steer to in that axis. For example, if $p_{min}=8$, $\alpha_{SLM}=3$ (in the y-direction), $\alpha_i=3$, and $n_y=500$, then $q_{max}>40$ (one can reduce $\alpha_{SLM}$ in the y-direction as it has no role in defining the passband). Note that we still keep $\alpha_{SLM}=5$ in the x-direction (the direction parallel to the axis of wavelength dispersion) to meet the passband requirements. One can use anamorphic (cylindrical) switch optics that simultaneously image the input fibre beam in the x-axis, and create an elongated beam along the y-axis with a Fourier-transform condition between the SLM plane and the output plane along the same axis. As a result, we can steer to a sufficiently large number of output ports in the y-direction for ROADM applications. However, a drawback of this approach is that we are unable to steer the beam in the x-direction.

It should be noted that here we make a distinction here between number of fibres that can be steered to, $q_{max}$, and the positional resolution of beam steering, defined as the minimum angular or spatial deflection of an output beam with respect to an output port. For example, we may be able to steer to 40 spatially separate fibres having a mode field radius of 5.2 µm, but with a spatial positional steering resolution of down to 0.2 µm.

N×M WSS Based on Two Switching Planes

Figure 4C:
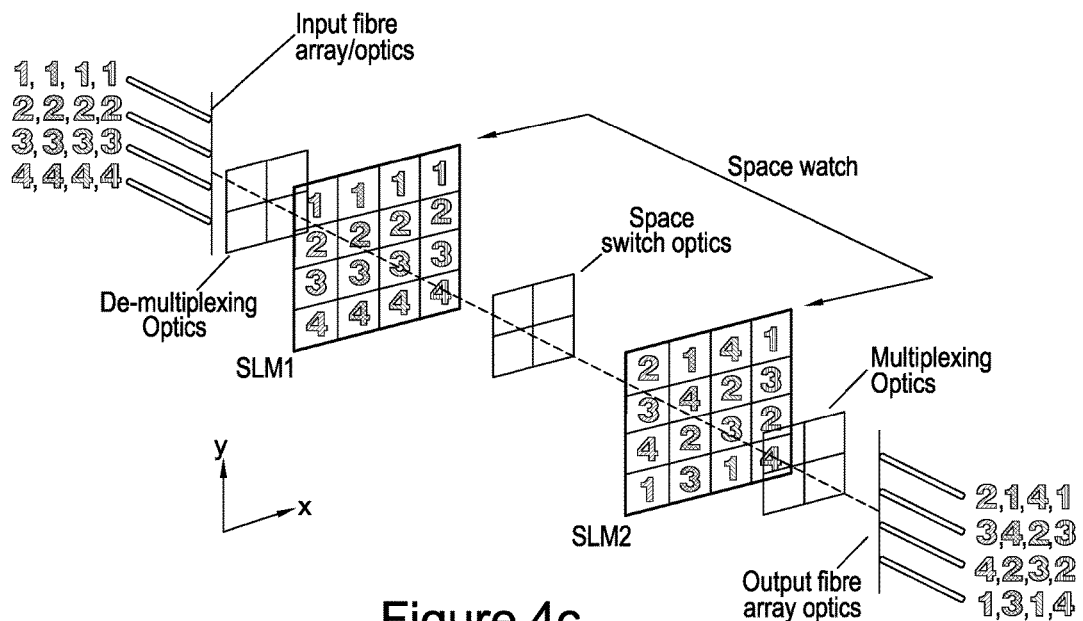

FIG. 4c illustrates the generic optical architecture of an N×M WSS based on two separate LCOS switch planes. In practice these two switch planes can be implemented on the same LCOS SLM. In the example system illustrated in FIG. 3, M=N=4. The switch comprises:

N input fibres.

Input optics, which may include polarization diversity components, and components to transform the Gaussian beam radius of the input beams.

A DEMUX component to angularly separate the data channels.

A first LCOS SLM plane.

A second LCOS switch plane.

Intermediate optics between the two switch planes.

A MUX component to angularly recombine the data channels.

Output optics.

M output fibres.

The switch operates as follows:

1) Optical data channels enter the switch via the N input fibres (denoted 1, 2, 3, and 4 in this example).
2) Each of the input beams are angularly de-multiplexed in the y-direction.
3) As a result, each wavelength channel from each input port illuminates a separate sub-hologram, with rows corresponding to a specific input fibre, and columns corresponding to a specific wavelength channel.
4) The first LCOS SLM displays gratings that angularly steer the beams in the yz-plane.
5) These beams are re-ordered in the y-direction when they are incident on the second LCOS plane.
6) A second set of blazed grating on the second LCOS plane then diffracts the beams such that when the MUX element recombines the wavelengths from a specific row, all wavelength channels propagate collinearly.
7) Output optics then focus the signal beams into one of the available M output fibres.

Although each sub-hologram can steer light in two-dimensions, to prevent signal contention in a WSS, light is only steered in the yz-plane between the two LCOS SLM planes. Such a system may be improved by considering the elongated beams at the sub-holograms, to maximize the values of N and M.

Flex-spectrum Data Format

Currently the telecom network operates using a series of wavelength channels with pre-assigned operating frequencies, known as the ITU grid. Typical channel spacing's are 100 GHz, 50 GHz, 37.5 HGz, or 25 GHz. Flex-spectrum, also referred to as Flex-grid, is a newer standard that allows for more flexible channel allocation, allowing a higher efficiency in the use of the available spectral bandwidth. In this specification when we refer to square sub-holograms, we generally (but not exclusively) refer to an unmodulated signal that has a circular Gaussian beam profile at the sub-hologram plane. As the data rate increases, the spectral content of a channel will also increase. As a result, the width of a sub-hologram will expand in the x-direction to accommodate the wavelength channel.

Design of a Stacked 1×N WSS Module Using Square Sub-holograms

Figure 5:
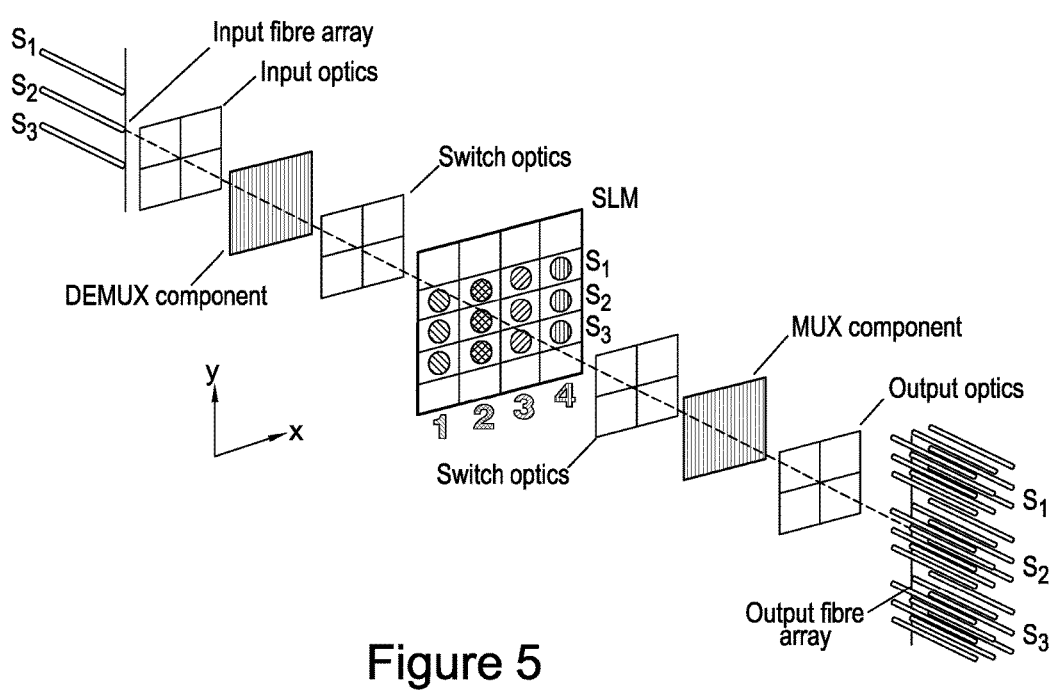
FIG. 5 shows a generic optical system where a number of 1×N WSSs are stacked using a common LCOS SLM.

We now describe a WSS based on a stacked array of 1×N WSSs and square sub-holograms. Referring to FIG. 5, this shows a 1×S array of input fibres (denoted $S_1$, $S_2$, and $S_3$ in this example), each carrying a set of WDM wavelength channels launch light into the switch. The input from each fibre is dealt with separately, and the wavelength channels from a specific input port are spatially de-multiplexed across a unique row of sub-holograms. The wavelength channels are then independently routed to a corresponding two dimensional fibre array comprised of S sub-arrays. The switch optics are designed to produce circular unmodulated signal beams at the LCOS SLM plane rather than elongated beams using anamorphic optics. These can be steered in both the x and y-directions simultaneously, rather than just in the direction perpendicular to the axis of dispersion. It is preferable (but not essential) to use an LCOS SLM with a larger pixel count to that described previously, say of order 4K×2K pixels. This increases the number of available pixels in the wavelength dispersion axis, albeit in this example only from 25 to 50 pixels (assuming 50 GHz channel spacing). Nonetheless, embodiments of the WSS approach we describe here have the potential of handling, in the case of a 4K LCOS SLM, up to forty separate 1×N WSSs, assuming square sub-hologram dimensions of 50×50 pixels for a 50 GHz frequency slot. In addition, in preferred embodiments the output fibre array is arranged as a two-dimensional structure where one can either use an S×N array of separate fibres at the output plane, or S multi-core fibres, each containing N separate fibre cores, as described later.

Wavefront Encoding Based on Common Filtering at the Objective Lens Input Plane

We have previously described a wavefront encoding technique to suppress crosstalk, in WO2012/123715. A development of this approach may be employed in the switch structure described here.

In particular a wavefront-modifying or "filter" element may be placed at the common input plane to the objective lenslet, that is at plane $P_o$. This filter acts as a "lock" that may then be matched by a suitably modified sub-hologram phase pattern. This has the effect of only correcting for the signal beam, and causes the other diffraction orders to couple inefficiently into the output fibres, thereby reducing crosstalk. Thus a switch system as described may incorporate a (single) filter a common plane for all output beams on the 1×N WSS switch structure. As in embodiments the relay system simply images the LCOS SLM plane at plane $P_o$, the implementation reduces to optimizing the output optics and the LCOS SLM hologram pattern. In the following section we discuss two example implementations of this approach in the context of the switch designs we describe.

Crosstalk from a blazed grating occurs due to quantization of the displayed phase pattern, which can be further exacerbated by the edge effect. The edge effect in a LCOS SLM device is a result of pixel fringing fields (the electric field due to the voltage applied to a pixel leaking across to neighbouring pixels) and liquid crystal material effects, and causes errors in the displayed phase profile (we have described techniques to mitigate this in WO2012/110811). As described in WO2012/123715, we can suppress crosstalk using an Axicon phase structure. For the purposes of the present switch design, we use wavefront encoding based on an Axicon phase element as follows:

An element with an Axicon phase profile, which is characterised by a variation in phase that is linear with respect to radius, is placed at the input objective plane. We denote this element as $A_1$.

This element may be a high resolution diffractive optical element, or refractive component.

If the wavefront leaving the LCOS SLM is simply a plane wave with a certain propagation vector $k(p,\varphi,\lambda)$, the output at the fibre plane will comprise a series of rings as opposed to Gaussian beams.

By adding a counter Axicon phase profile to the grating phase profile we can compensate for the Axicon phase profile of $A_1$.

The signal beam will therefore be focused to a Gaussian beam profile.

Higher and symmetric diffraction orders are focused to rings.

The approach here is that a ring focus may be engineered to miss the fibre core, thereby minimizing crosstalk as the centre of the ring will have minimal optical power. To illustrate this approach we show simulated replay fields in FIG. 13 for three cases:

1) The sub-hologram displaying a blazed grating with no common filter element.
2) The sub-hologram displaying a blazed grating, and the common filter element displaying a quantized Axicon (quantization finer than the LCOS SLM pixel size).
3) The sub-hologram displaying a phase pattern that is a combination of the blazed grating and an inverse of the common filter Axicon phase profile.

Figure 6:
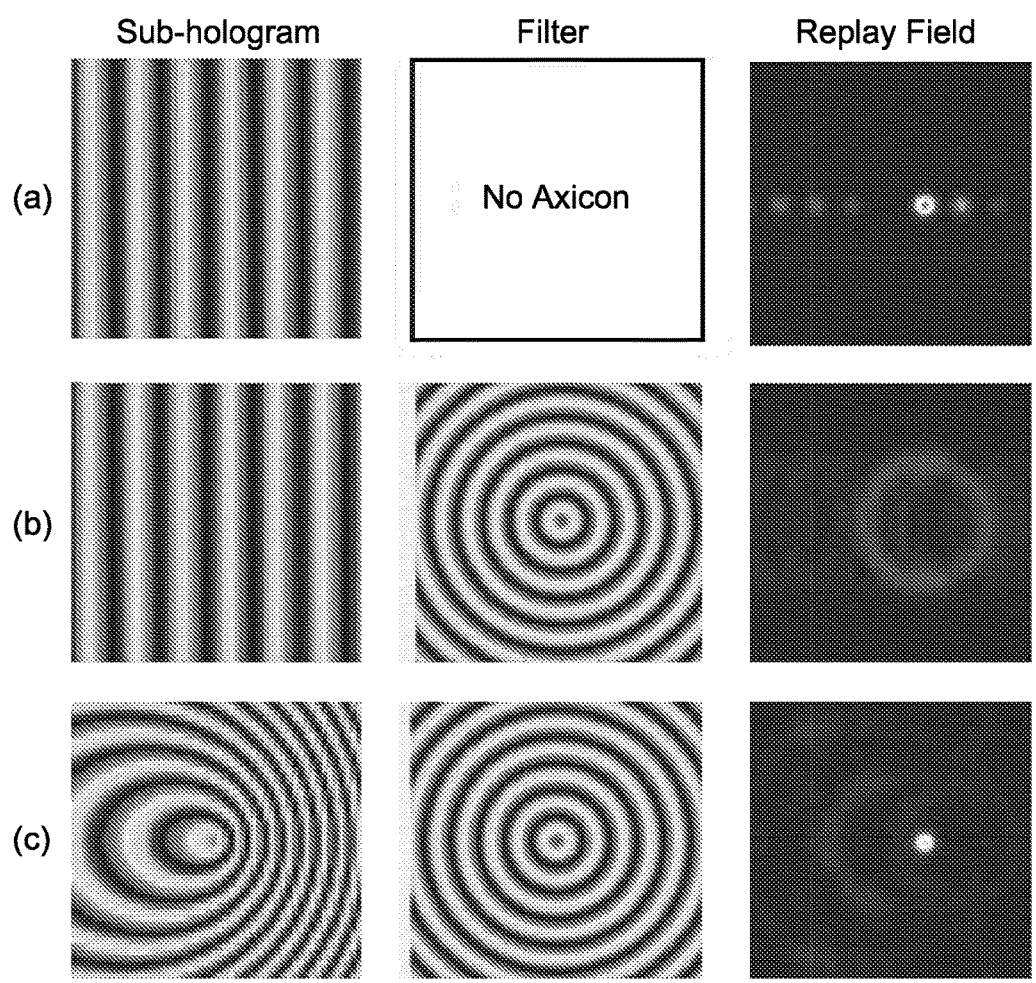
FIG. 6 illustrates an example of wavefront modification at the objective lens input plane using an axicon phase component.

In FIG. 6 the columns show the phase pattern at the sub-hologram plane, the filter, and the corresponding replay plane. The rows show (a) grating and no Axicon, (b) grating and Axicon, and (c) modified grating (grating plus compensating Axicon phase profile) and Axicon. As can be seen, in (c) the higher and symmetric crosstalk orders of (a) are now spatially dispersed into effectively rings, whilst the signal beam is still focused. For this specific simulation, the calculations assume a sub-hologram of 50×50 pixels with an incident Gaussian beam radius one fifth of the sub-hologram size. The grating period is eight pixels, and the Axicon slant angle is 3°. A total of 128 phase levels are assumed, and the nematic liquid crystal edge effect is included in the simulation.

The wavefront modification element may comprise a more general matched spatial filter, for example of the type used in optical correlator technology and optical data encryption. The phase profile of the filter may be optimized to diffract light away from the fibre cores unless an inverse phase profile is added to the grating phase profile. It should be noted that the common matched spatial filters in a stacked 1×N WSS may be implemented using the LCOS SLM, thereby allowing for possible reconfiguration. An advantage of this approach is that one can optimize the matched spatial filter phase profile to minimize crosstalk in an arbitrary manner.

In a further approach one can supress crosstalk by adding focal power to the sub-hologram and by realigning the optical planes such that only the +1 order is focused at the fibre plane. In this case no additional element need be used at the input plane of the objective lens as the objective lens itself is essentially the filter.

Super Gaussian Beams

Broadly speaking we will describe use of a non-standard Gaussian beam, in embodiments a super Gaussian beam, in a wavelength selective switch (WSS) of the type described above.

Passband of WSSs

As mentioned above, the passband is an important performance parameter for WSS. Where the un-modulated beams have a standard Gaussian profile along the dispersion axis on the SLM plane, this can be expressed as:

$$I = I_o \exp\left(-2\left|\frac{r}{\omega_{SLM}}\right|^2\right) \quad (2)$$

where $w_{SLM}$ is the Gaussian beam waist.

The passband can be improved by increasing the ratio $\alpha_{SLM} = n_y \Delta / w_{SLM}$, i.e. either reducing the beam waist the SLM plane or increasing dispersion between WDM channels.

The passband can also be improved by displaying holograms with different diffraction efficiencies for different spectral regions on the SLM. However, this method increases the insertion loss of the switch.

Non-Gaussian Beams in WSSs

One can improve the passband of the WSS by generating a non-Gaussian beam profile, for example a super Gaussian beam, along the dispersion axis on the SLM plane. This approach may be implemented in a wide variety of designs, for example in those described with reference to FIG. 4, as well as in the more sophisticated designs we described subsequently. For simplicity, the embodiments described below will be based on the FIG. 4a example.

The super Gaussian beam profile can be expressed as $$I = I_o \exp\left(-2\left|\frac{r}{\omega_{SLM}}\right|^n\right) \quad (3)$$

where n represents the super Gaussian order, which should be >2.

Figure 7A:
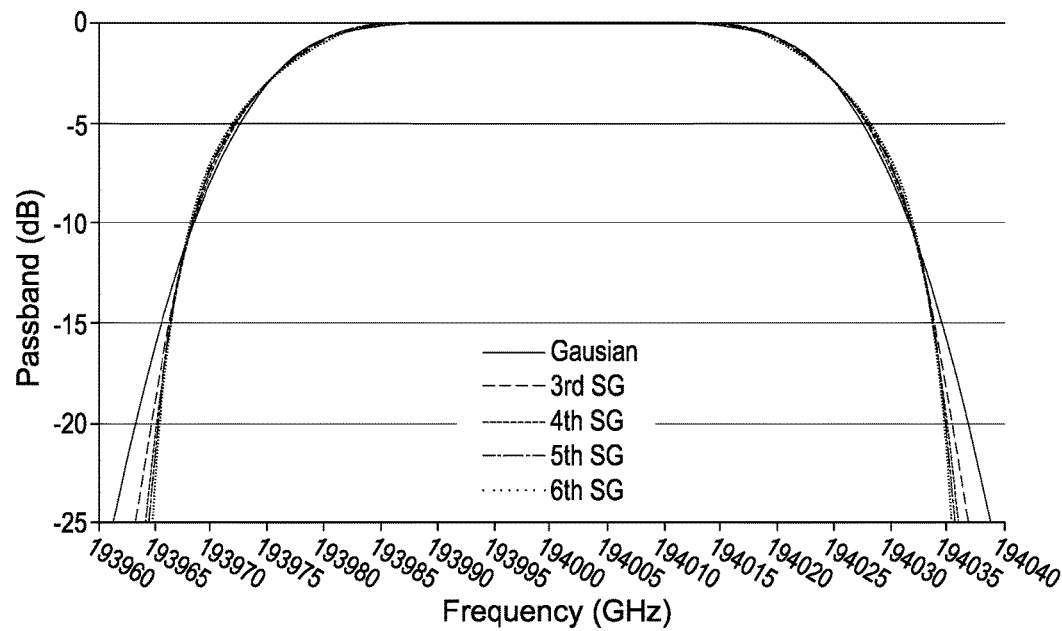
FIGS. 7a and 7b show, respectively, WSS passbands for Gaussian and super Gaussian beams, and corresponding beam profiles on the SLM plane.

FIG. 7a shows WSS passbands with the standard Gaussian and $3^{rd}$ to $6^{th}$ order super Gaussian beams with the same value of $w_{SLM}$. The central frequency of these beams is 194000 GHz and $\alpha_{SLM}$ is 5 for a 50 GHz channel.

Figure 7B:
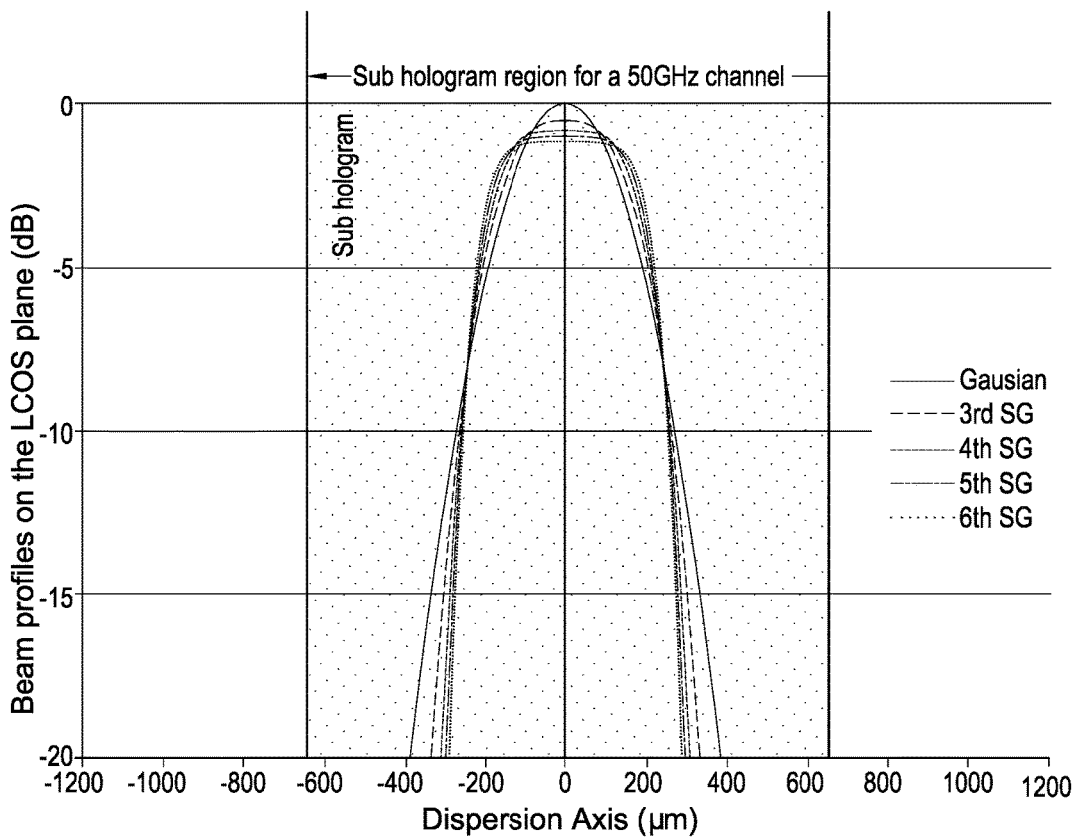

A beam passing through a WSS has a spectral distribution which is a convolution between that of the input signal and the passband (filter function) of the WSS. Thus FIG. 7b shows the beam profile shapes on the SLM plane which result in the passbands illustrated in FIG. 7a. In a telecom network, the optical signal will go through multiple WSSs. As a result, the cumulative passband of cascaded WSSs is important.

Figure 8A:
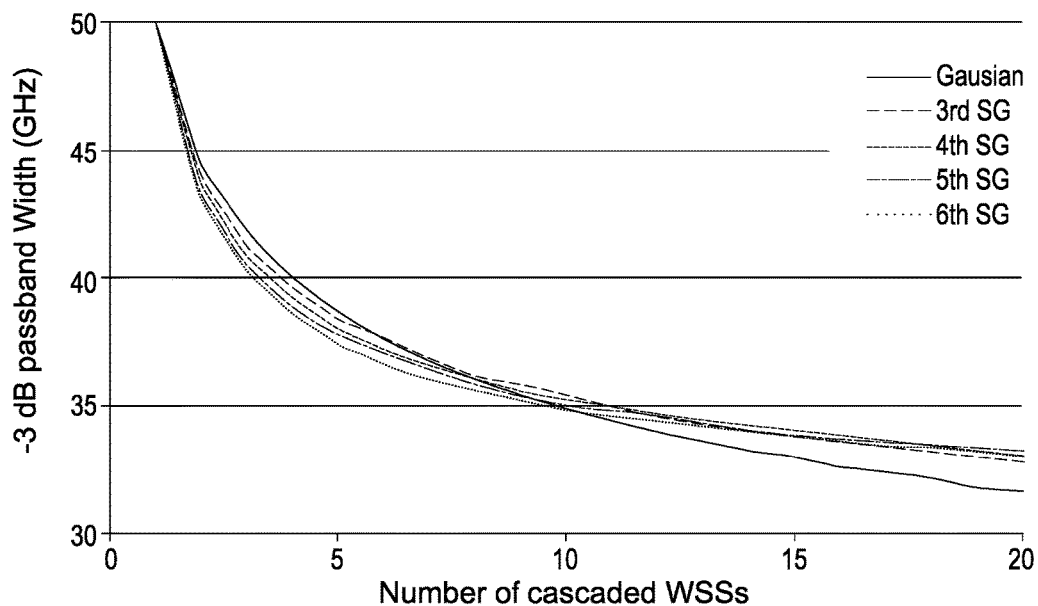
FIGS. 8a and 8b show, respectively, the −3 dB passband width and −0.5 dB passband width of cascaded WSSs with various beam shapes on the SLM plane.
Figure 8B:
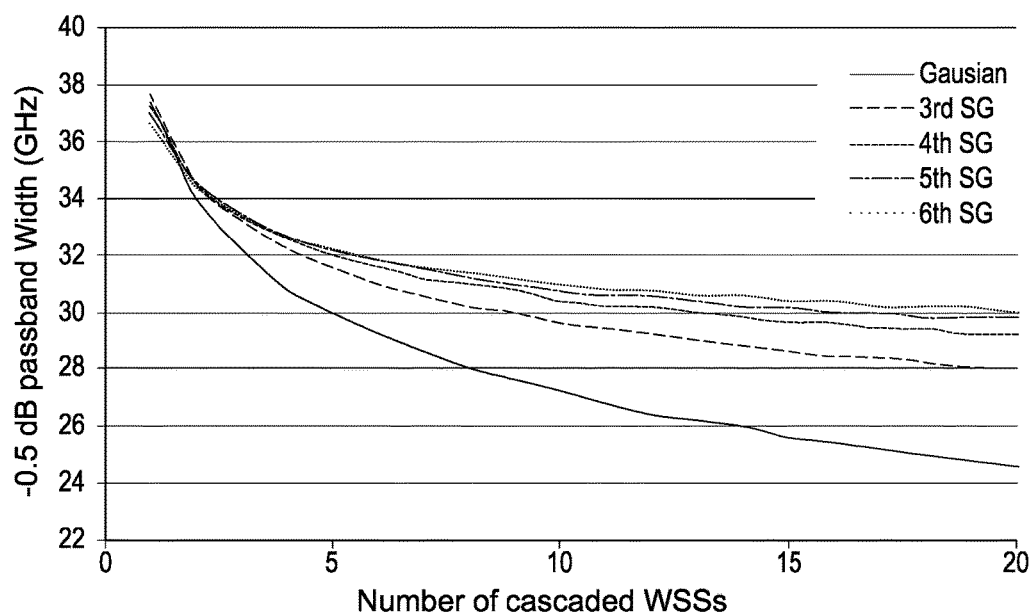

To illustrate this effect we assume that the passbands of the cascaded WSSs are perfectly aligned, i.e. that the central frequency of the individual passbands is the same. The −3 dB and −0.5 dB passbands of cascaded WSSs with various beam shapes are plotted with respect to the number of cascaded WSSs in FIGS. 8a and 8b respectively. It can be seen that WSSs with a super Gaussian beam along the dispersion axis on the SLM plane have a wider cumulative −3 dB passband when a plurality (for example more than 10) of WSSs are cascaded. The improvement is more apparent when the −0.5 dB passband is considered.

Figure 9:
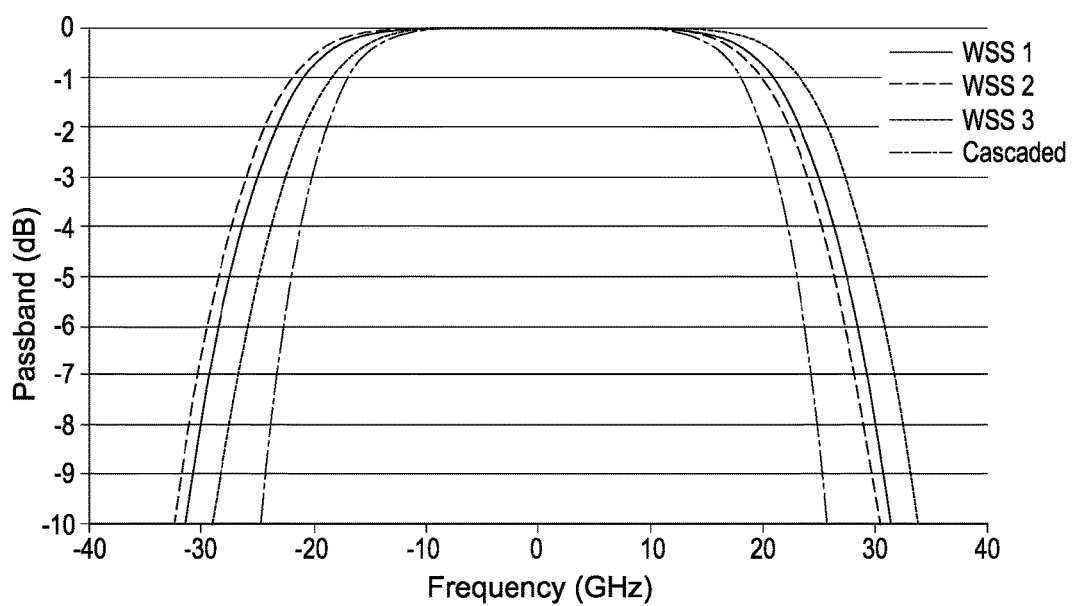
FIG. 9 shows misalignment of the central frequency of the passbands of individual WSSs.
Figure 10A:
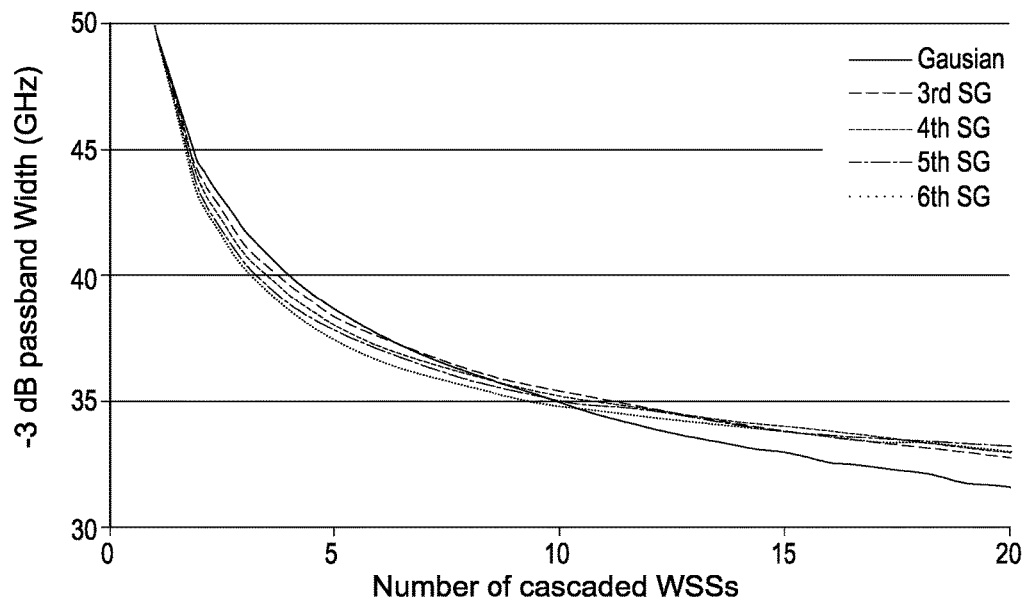
FIGS. 10a and 10b show, respectively, the −3 dB passband width and −0.5 dB passband width of cascaded WSSs with misaligned passbands.
Figure 10B:
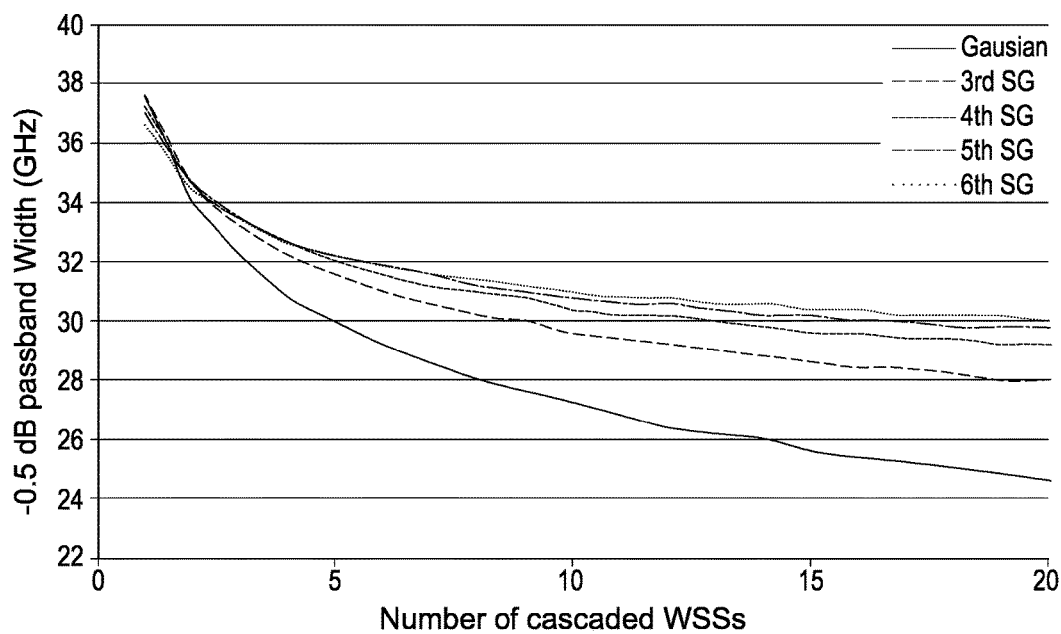

In reality the central frequency of the passbands of individual WSSs may be misaligned in a telecoms network. An example is illustrated in FIG. 9, where the dashed lines illustrate passbands of three individual WSSs. These passbands are misaligned; the solid line shows the accumulative passband when the three WSSs are cascaded. FIGS. 10a and 10b show a simulation of this. In the simulation, the misalignment of the 50 GHz passband of WSSs follows a normal distribution with a standard deviation of 1 GHz. By using a Monte Carlo method, the worst-case cascaded passbands were identified with the respect to the number of cascaded WSSs. The results for the −3 dB and −0.5 dB passbands are shown in FIGS. 10a and 10b respectively. It can be seen that a super Gaussian beam shape on the SLM plane improves the cascaded passband width in a case where multiple WSSs are coupled in series.

Implementation

Figure 11A:
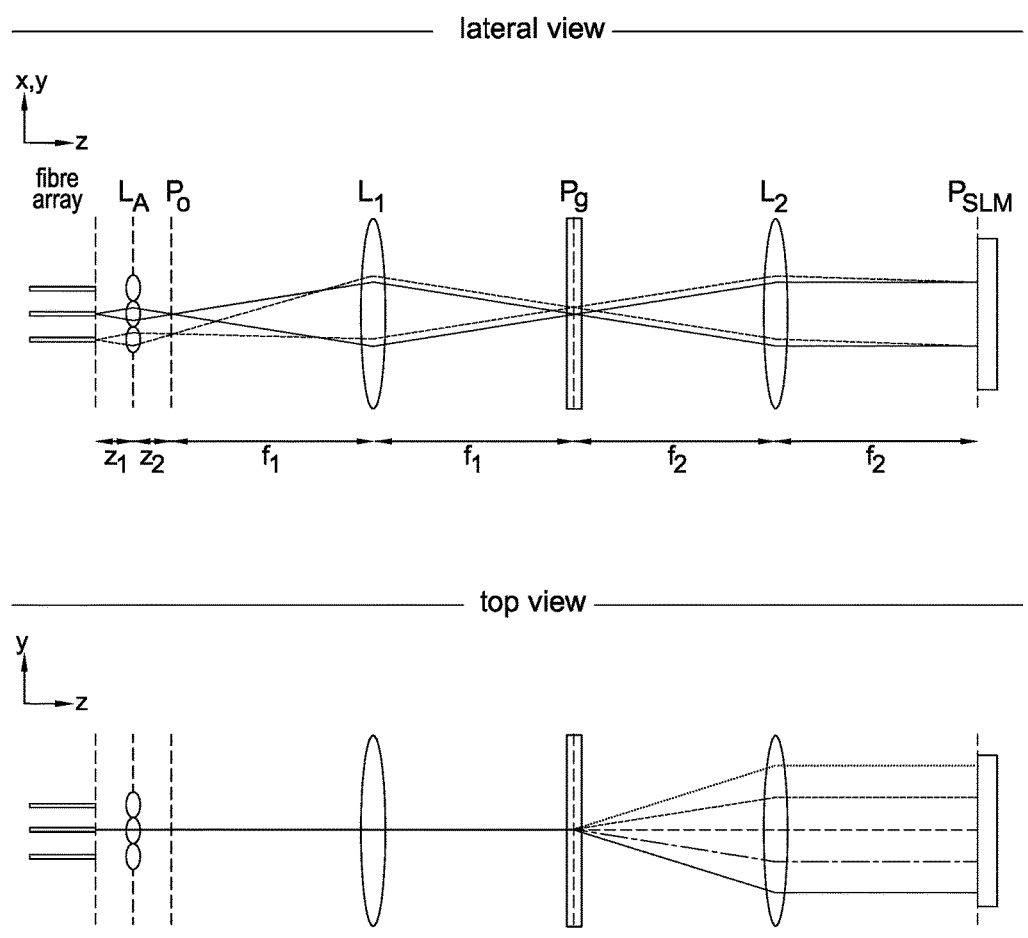
FIGS. 11a and 11b show, respectively, an example of a WSS switch including a microlens array, and a version of the switch including an array of optical elements for Gaussian/super Gaussian beam intensity profile conversion according to an embodiment of the invention.

FIG. 11a shows an example of a WSS switch. In this example, a micro-lens array, $L_A$ is used to increase the effective mode field radius of each single mode fibre in the fibre array in order to more closely match the dimension of the optical components and the deflection capabilities of the SLM. As a result, a high fibre coupling efficiency and better tolerance can be achieved. In this case the plane $P_o$ becomes the effective input/output plane of the switch.

Referring to the lateral view in FIG. 11a, Lens $L_1$ and Lens $L_2$ together image the input/output plane to the SLM plane ($P_{SLM}$), optionally also with some magnification. The (in this example 1-D) linear diffraction grating ($P_g$) affects the optical propagation along the dispersion axis. More particularly it disperses the C-band wavelengths along the dispersion axis on the SLM. The switch may have a 2D output port arrangement, depending on the beam steering capability of the SLM.

In the example of FIG. 11a the beam has a Gaussian profile along the dispersion axis on the SLM plane. However one or more beam-shaping elements can be included in this system to generate a super Gaussian beam profile along the dispersion axis on the SLM plane.

Free-form Optics Embodiment

Figure 11B:
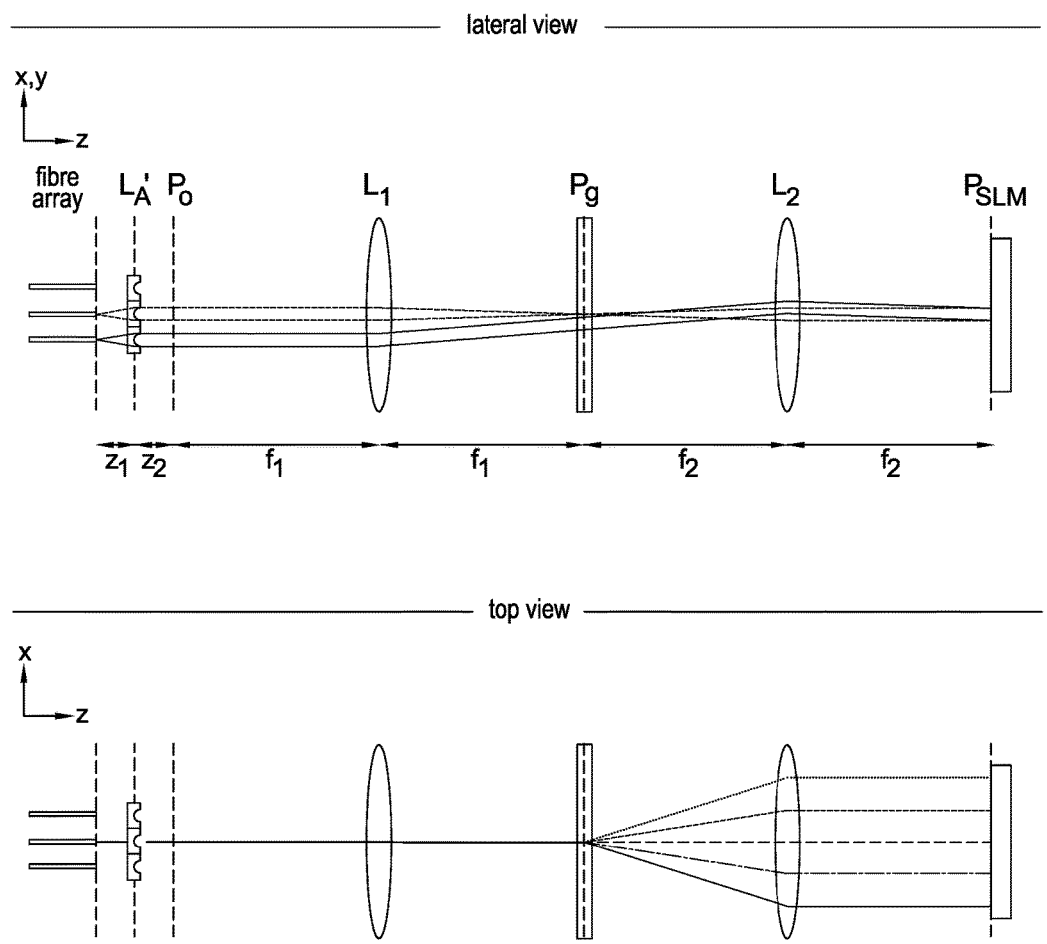

One example implementation is illustrated in FIG. 11b. In this embodiment, free-form optics, array $L_A'$, is used to generate a super Gaussian beam profile at the plane $P_o$. This is subsequently imaged to the plane $P_{SLM}$ by $L_1$ and $L_2$.

An example of the design of suitable free-form optics for each fibre of the array is described in J. D. Mansell et al. "Gaussian to super-Gaussian laser beam intensity profile conversion using glass micro-optic fabricated with reflowed photoresist", *Conference on Laser and Electro-Optics (CLEO)* 2000. Pp. 406-407. Any optical defects introduced by the free-form optics may be compensated by the sub-hologram used for the beam steering; a computer generated hologram procedure (such as outlined elsewhere herein) may be employed the hologram calculation.

In some embodiments, referring to the output beams, the free-form optics only converts the specific wavefront at $P_o$ back to the standard Gaussian beam, and thus only this is subsequently coupled into the fibre with high efficiency, resulting in some suppression of crosstalk.

Diffractive/Refractive Optical Element Embodiment

Figure 12:
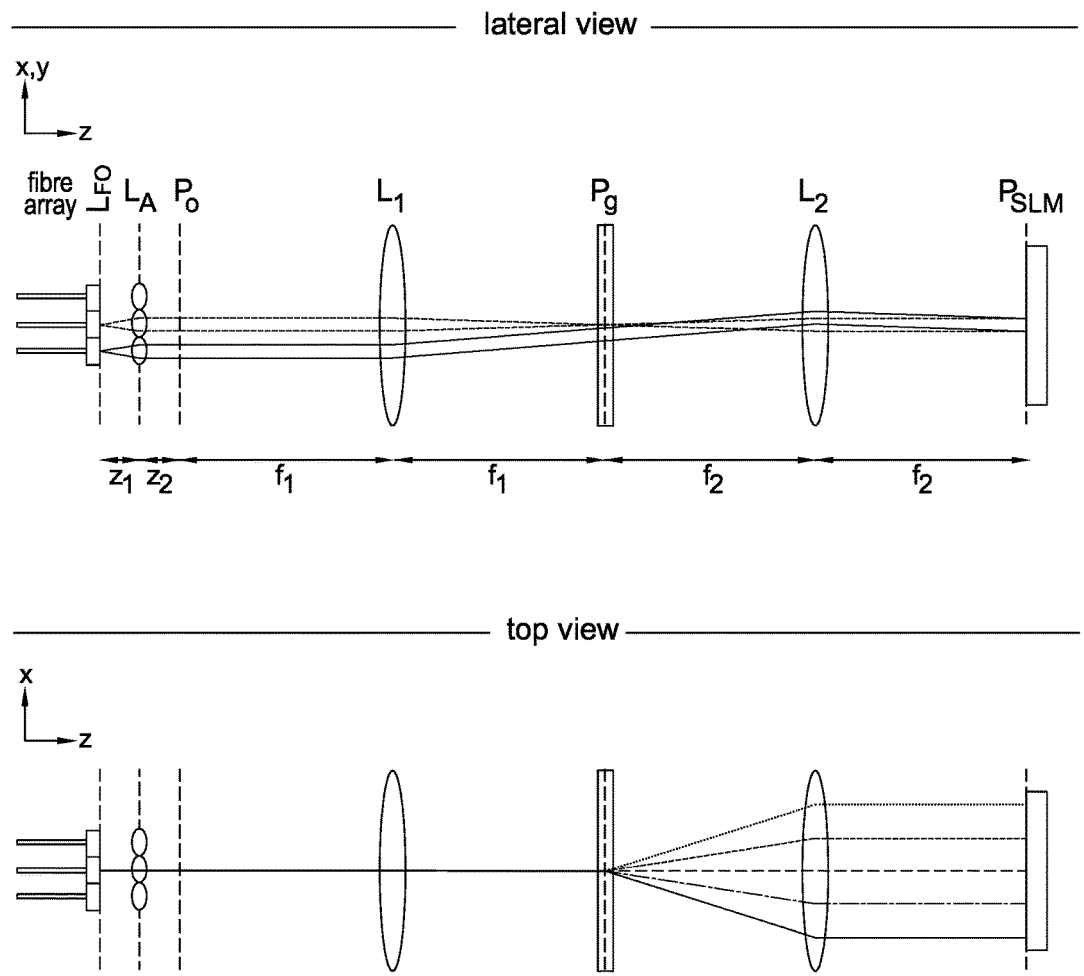
FIG. 12 shows and a second version of the switch of FIG. 11a including an array of optical elements for Gaussian/super Gaussian beam intensity profile conversion according to an embodiment of the invention.

Another example implementation is illustrated in FIG. 12. In this embodiment, a refractive/diffractive optical element, array $L_{FO}$, is inserted immediately after (adjacent to) the fibre (array). Together with the micro-lens array (array $L_A$), this generates a super Gaussian beam profile at the plane $P_o$, which is subsequently imaged to the plane $P_{SLM}$ by $L_1$ and $L_2$. Again, in embodiments refractive/diffractive optical element only converts the specific wavefront at $P_o$ back to the standard Gaussian beam, and thus only this is subsequently coupled into the fibre with high efficiency, resulting in some suppression of crosstalk.

Figure 13:
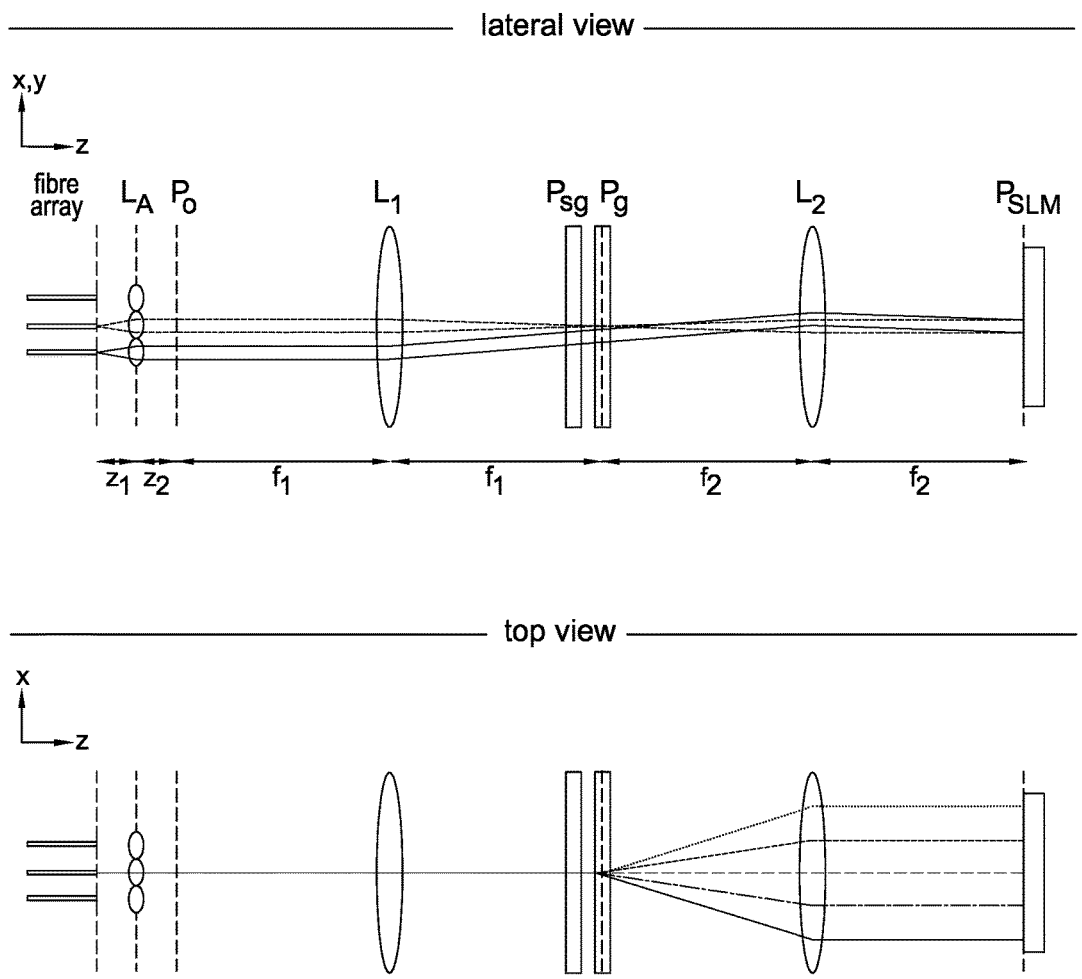
FIG. 13 shows a third version of the switch of FIG. 11a including a refractive/diffractive optical element for Gaussian/super Gaussian beam intensity profile conversion according to an embodiment of the invention.

A further example implementation is illustrated in FIG. 13. In FIG. 13 the refractive/diffractive optical element ($P_{sg}$) is inserted immediately before (adjacent to) the diffractive grating ($P_g$). In this case, the refractive/diffractive optical element ($P_{sg}$) generates a super Gaussian beam profile at its replay field, which coincides with the SLM plane ($P_{SLM}$).

Figure 14:
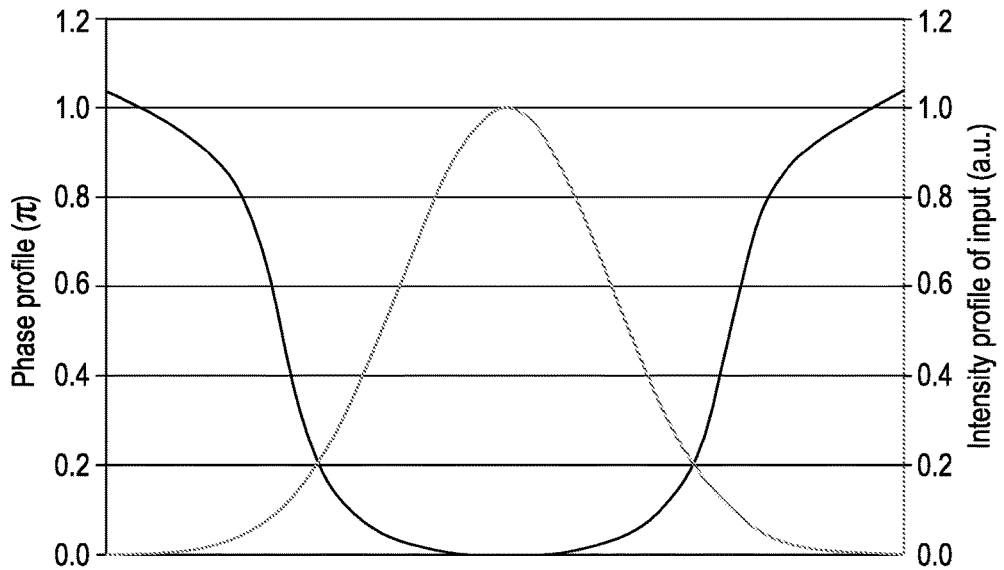
FIG. 14 illustrates a technique for super Gaussian beam generation using diffractive optical element.

In either of these configurations a computer generated hologram (CGH) algorithms, for example Gerchberg-Saxton algorithm or simulated annealing procedure, may be used to design the phase profile of the/an individual refractive/diffractive optical element. FIG. 14 shows an example phase profile with respect to the beam intensity profile at the plane of the inserted optical element.

Figure 15:
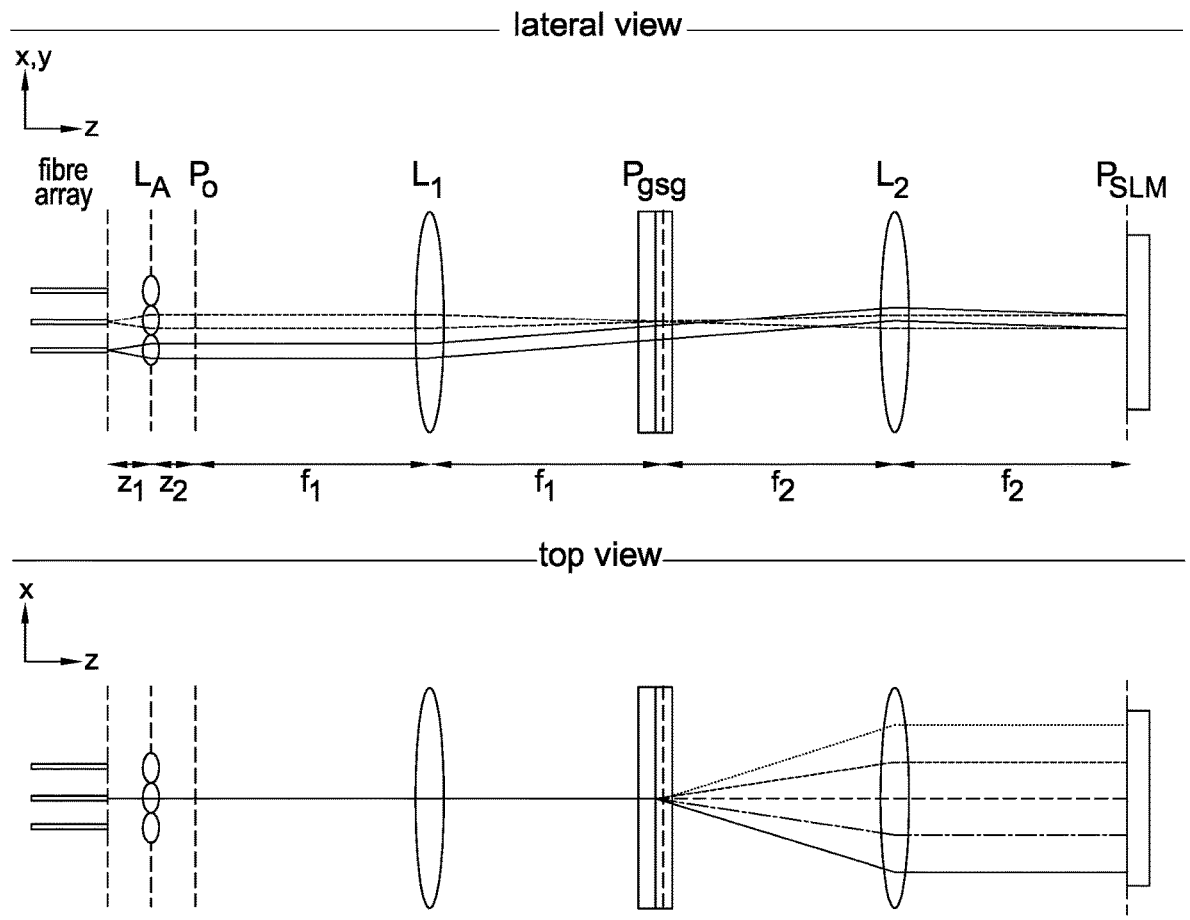
FIG. 15 illustrates a technique for super Gaussian beam generation in a WSS using a diffractive optical element, according to an embodiment of the invention.

It is also possible to add the computer generated phase profile onto the diffractive grating ($P_g$) so that the two components becomes a single diffractive optical element ($P_{gsg}$) as shown in FIG. 15. This component is then responsible for both wavelength dispersion and super Gaussian beam profile generation.

The process of combining these two elements can be mathematically described as:

$$P_{gsg} = \text{angle}(\exp(i(P_g + P_{sg}))) \quad (4)$$

where $P_{gsg}$ is the phase profile of the combined element, $P_g$ the phase profile of the diffractive grating, and $P_{sg}$ the phase profile of the diffractive/refractive optical element responsible for the super Gaussian beam generation.

Again, any optical defects introduced by the refractive/diffractive optical element may be compensated by the sub-hologram for the beam steering. Again a computer generated hologram procedure may be employed to calculate the relevant hologram.

Wavefront Encoding

We now describe techniques for wavefront encoding, taken from WO2012/123715, and will then describe their application to improving security in WSSs and related optical systems.

Wavefront Encoding—Details

As used herein a kinoform is a phase (only) hologram (rather than an amplitude hologram). Thus in this regard preferred embodiments of the previously described WSSs employ kinoform holograms displayed on an SLM. The use of a holographic approach, where a spatially non-periodic phase pattern is displayed, allows deflection to a 3D volume rather than a 2D plane, and in embodiments we use this for wavefront encoding. One can then, for example, purposefully introduce a wavefront error, such as defocus, into the optical system to reduce the amount of crosstalk power that is coupled to the output ports. To correct for this aberration, the pattern displayed on a dynamic hologram is adjusted to ensure optimum coupling of the +1 diffraction order into the desired output port, resulting in defocus of the noise orders.

Figure 16A:
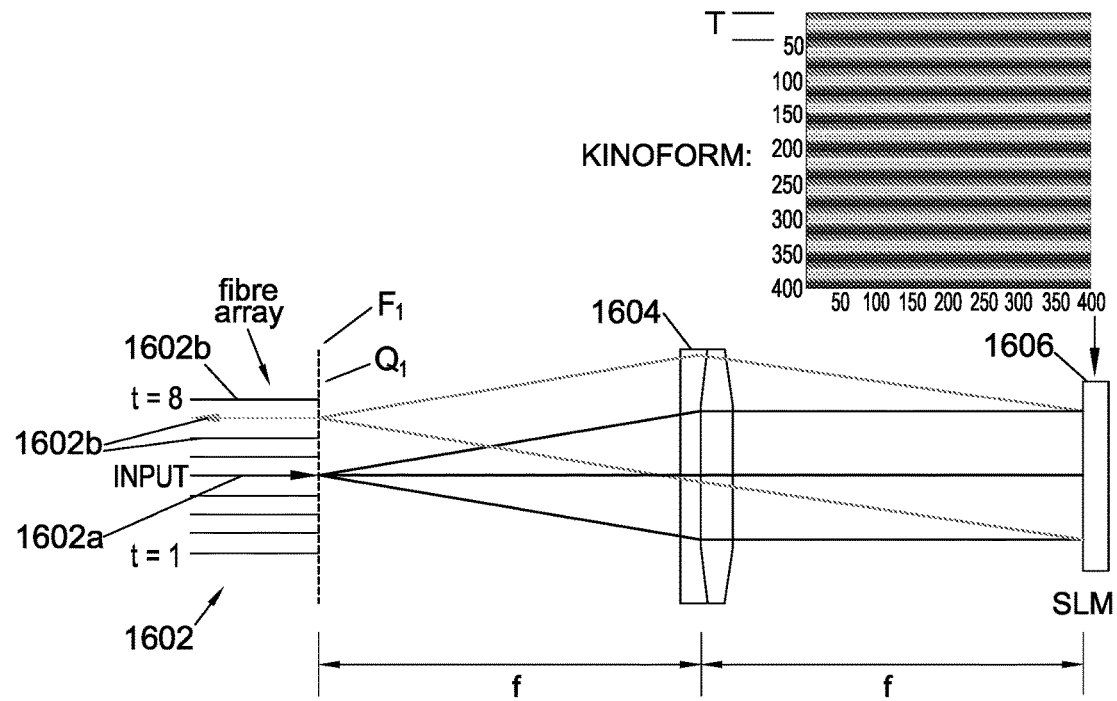
FIGS. 16a to 16c show, respectively, a schematic illustration of optical beam routing apparatus showing a perfectly aligned system; a defocused system employing wavefront encoding; and example optical beam routing apparatus employing wavefront encoding.
Figure 16B:
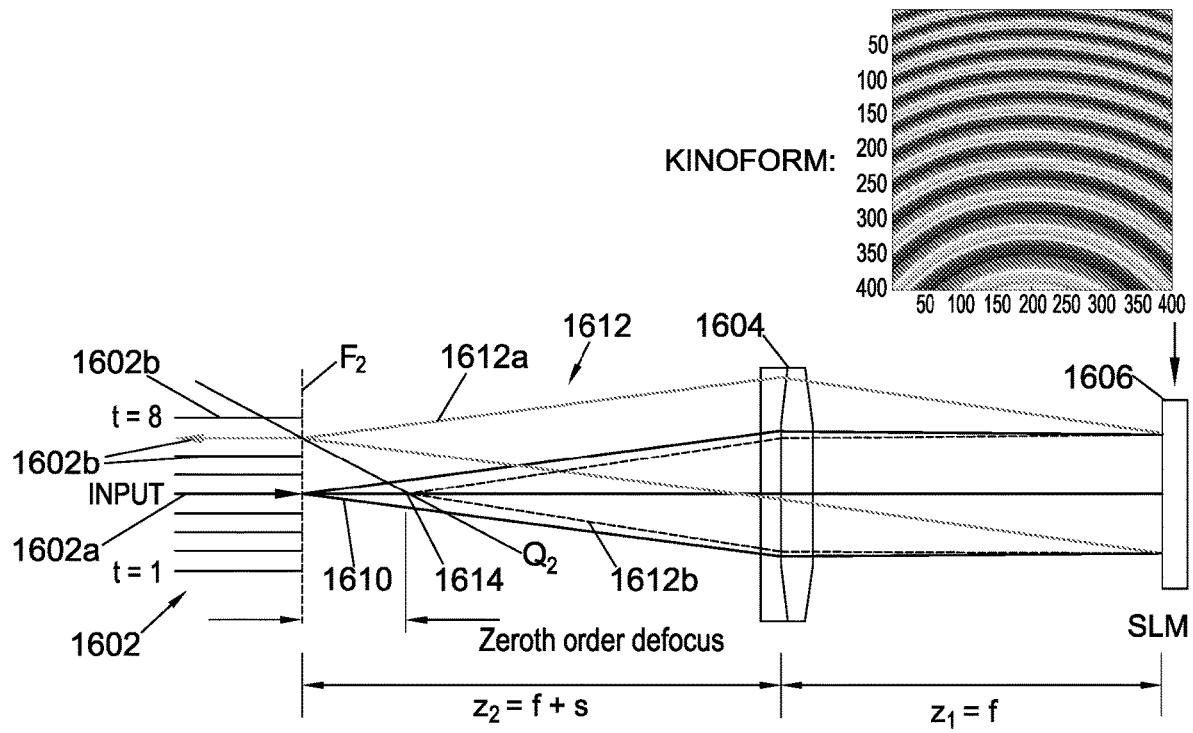

FIGS. 16a and 16b illustrate the idea of wavefront encoding based on defocusing. The 2f optical arrangement of FIG. 16a comprises an input/output fibre array 1602 comprising, in this example, a single input fibre 1602a and a plurality of output fibres 1602b. The array 1602 is positioned at plane $F_1$, and the apparatus also comprises a reflective spatial light modulator 1606, and a Fourier transform lens 1604 (as previously described). The input signal, launched into the system via a central fibre 1602a, is collimated, and is then incident on the SLM 1606 where a quantized phase-only blazed grating is displayed. The incident beam is diffracted into a number of orders, the power in each, $P_m$, being dependent on the exact nature of the phase pattern, which are focused at plane $Q_1$. Due to the symmetry of this system, planes $Q_1$ and $F_1$ coincide, and the focused beams have the same spot profile, though different peak intensities. This can lead to crosstalk, wherein if we aim to direct the +1 order to one of the output fibres, light remaining in other orders may couple into one or more of the other fibres. To address this problem we purposely move the fibre array back a distance s from plane $F_1$ to plane $F_2$, and compensate for the defocusing effect by adding a lens function to the grating. This can be done, for example, by displaying an off-axis lens. Combining a grating with a lens results in the diffraction orders being focused at different planes.

Referring now to FIG. 16b, this shows a schematic illustration of defocused optical beam routing apparatus employing wavefront encoding according to an embodiment of the invention. Like elements to those of FIG. 16a are indicated by like reference numerals. In FIG. 16b, the kinoform incorporates lens power and thus has curved rather than straight "fringes". Thus an input beam 1610 from input fibre 1602a is diffracted by reflective LCOS SLM 1606 to provide an output beam 1612. If we optimize the SLM pattern (kinoform) such that the +1 order of the output beam 1612a is focused at plane $F_2$, we will only obtain optimum coupling efficiency for that order; all other orders (see dashed lines of zeroth order 1612b as an example) are focused on a new surface, $Q_2$, which is no longer co-planar with respect to $P_2$—note that in FIG. 16b plane $Q_2$ is tilted. The zeroth order, for example, has a focus at location 1614, displaced away from the plane of array 1602. (The skilled person will appreciate that it is not essential to employ the arrangement of FIG. 16b where the SLM is one focal length behind the lens 1604—for example, lens 1604 could be attached to the SLM).

Using geometric optics we can show that the defocus of the $m^{th}$ order, d(m), is given by $$d(m) = 2s + \frac{f^2}{f_H} m \quad (5)$$

where s is the displacement of the output from the focus, f is the focal length of the Fourier transform lens, and $f_H$ is the focal length of the lens on the hologram (kinoform). The condition that the m=+1 order is focused at the output fibre plane for a given defocus value of s is $$f_H = -\frac{f^2}{2s} \quad (6)$$

The position of the +1 beam at the fibre plane, $p_B$, as a function of off-axis lens offset, $p_L$, can be shown to be $$p_B = \frac{2s}{f} p_L \quad (7)$$

Figure 16C:
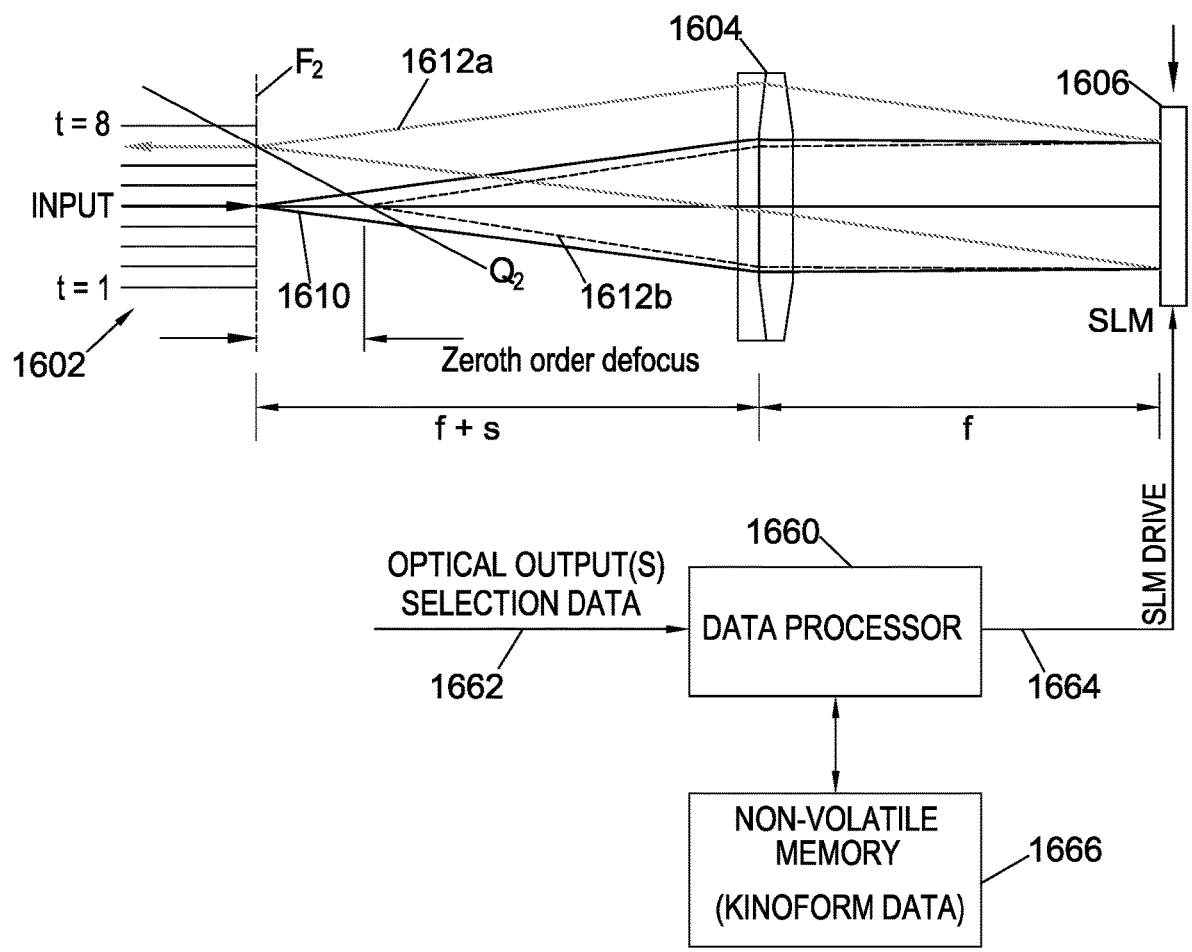

FIG. 16c shows a simple practical embodiment of optical beam routing apparatus employing wavefront encoding, according to the invention. Again, like elements to those of FIG. 16b are indicated by like reference numerals. The apparatus of FIG. 16c includes a data processor 1660 having a select input 1662 to receive output selection data for selecting one (or more) outputs to which to steer the input beam (or beams). Data processor 1660 also provides a drive output 1664 for driving SLM 1606 with selected kinoform data, and non-volatile memory 1666 storing kinoforms for display to i) route the output beam to the selected output(s) and ii) apply a wavefront modification correction for the selected output(s).

Figure 17A:
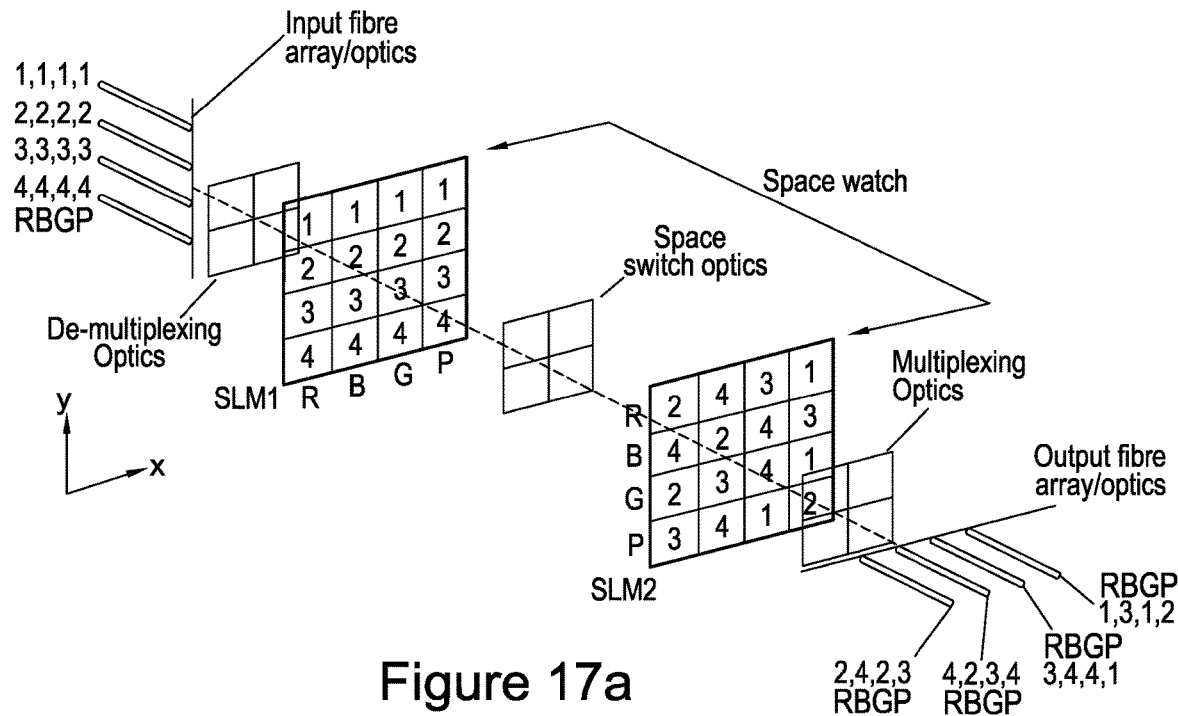
FIGS. 17a to 17c show an example of a wavelength division multiplexed (WDM) optical switch employing two SLMs, the system comprising a linear input fibre array/optics and de-multiplexing optics, two SLM switching planes and related optics that function as a space-switch, multiplexing optics that recombine up to N wavelengths, and a linear output fibre array/optics that couple data out of the switch; a second example of a WDM switch, in which spatially separated blazed gratings are displayed on the SLM; and a WDM optical switch employing wavefront encoding according to an embodiment of the invention, in which different switched wavelengths are diffracted by spatially different regions on the SLM displaying different kinoforms.
Figure 17B:
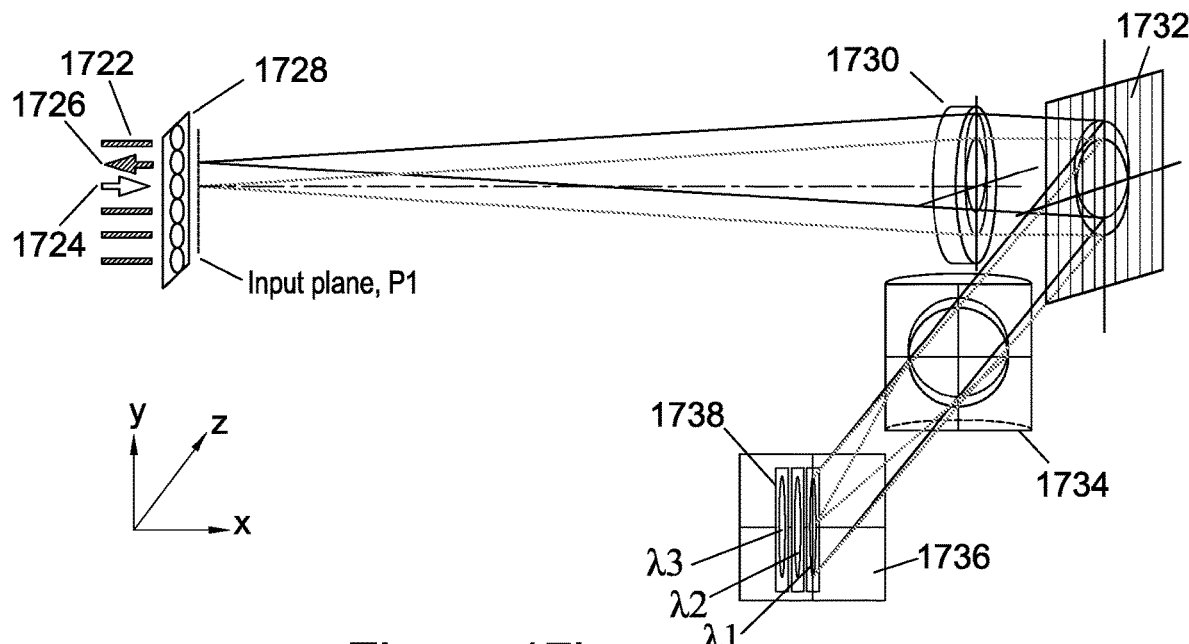
Figure 17C:
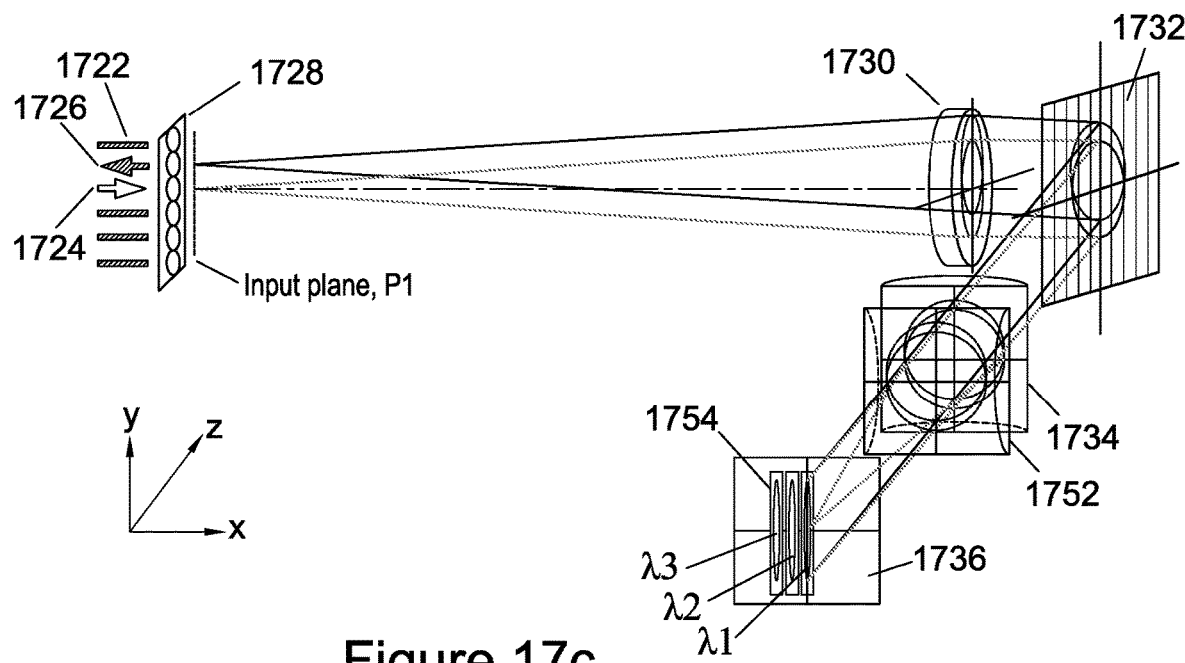

Referring now to FIG. 17c, this shows an embodiment of the wavefront encoding technique we describe applied to a WDM switching structure. To explain the operation of FIG. 17c, consider first FIG. 17b, which shows a WDM switch where independent, spatially separated, periodic blazed gratings are displayed on the SLM to route light from one input fibre to a number of output fibres.

The system comprises: A linear single-mode input/output fibre ribbon array 1722; a lenslet array 1728 having the same pitch as the fibre array and lenslets of substantially identical focal lengths; a collimating lens 1730 of focal length f1; a static transmission grating (multiplexer/demultiplexer) 1732 that angularly disperses the WDM wavelengths; a cylindrical lens 1734 of focal length (f1)/2; and a reflective spatial light modulator 1736.

In FIG. 17b each wavelength has its own sub-grating 1738 displayed on SLM 1736. This is essentially a Fourier-transform based interconnect, where the input/output plane is placed at the front focal plane of a lens, and the SLM placed at the back focal plane. Input data 1724 is routed to output 1726; different wavelength components of the input data may be routed to different selected outputs.

Light enters from the left via the central fibre, and the corresponding lenslet transforms the input mode field radius from 5.2 µm to 50 µm beam waist at the switch input plane, P1. The reason for this mode conversion is to ensure that the beam entering the switch has a divergence to match the SLM beam steering capabilities, the limited dispersion angle of the static de-multiplexing grating, and the requirement to cover a sufficient number of SLM pixels for efficient diffraction. The input beam is collimated by the collimating lens, de-multiplexed by the static diffraction grating into a linear spread of wavelengths which are focused by the cylindrical lens into an array of elliptical beams on the SLM ready to acquire an angular deflection. In one constructed arrangement, beams cover 400 pixels in the y-direction and 5 pixels in the x-direction. Deflection is in the yz plane. The beam then retraces its steps, is multiplexed by the diffraction grating and any angular displacement it has achieved at the SLM is converted into a positional displacement at the lenslet array. The light is then focused down by a lenslet in front of each fibre to maximize coupling efficiency. Thus individual wavelengths to be independently routed as required by displaying a blazed grating (routing to one fibre) or by a hologram to more than one or more fibres using the techniques described in the first patent.

Preferably, in order to ensure that the light launched into each fibre is normal to that fibre, and that the wavelengths focused onto the SLM plane are normal to the SLM for each wavelength, we arrange the system so that the optics are doubly telecentric. This entails that the distance from the plane P1 to the collimating lens=f1, the distance from the collimating lens to the SLM plane=f1, the distance from the collimating lens to the cylindrical lens=(f1)/2, and thus:

$$\text{distance from the cylindrical lens to the SLM} = (f1)/2 \quad (8)$$

The cylindrical lens focuses each wavelength to a beam waist in the x direction, whilst the light remains collimated in the y-direction. The system of FIG. 17b therefore has similar crosstalk characteristics to the system shown in FIG. 17a as the diffraction orders are all focused at the same plane.

Referring now to FIG. 17c, this shows an example of a WDM switch using wavefront encoding according to an embodiment of the invention, with the aberration introduced by a second cylindrical lens.

To reduce the crosstalk we introduce a purposeful defocus of the light in the zy plane by placing a second cylindrical lens 1752 of focal length f2 that is aligned orthogonally to the original cylindrical lens as shown in FIG. 17c. This does not affect the focusing of the light in the xz plane significantly, although we shift the position of the SLM in the local z-direction to compensate for the thickness of the second cylindrical lens (note that the second cylindrical lens 1752 can also be placed before the first cylindrical lens 1734). However, the light in the yz plane is no longer collimated, but converges. If we displayed a blazed grating, the light focused at the fibre plane would be astigmatic, and would no longer couple efficiently into the output fibres. If, however, we display a non-periodic kinoform, in this case as an off-axis cylindrical lens of the correct focal length, the target order is no longer astigmatic, and therefore couples efficiently into the target fibre. The other diffraction orders of the off-axis cylindrical lens, however, further aberrate, and couple inefficiently. Thus, by adding a cylindrical lens to aberrate the input light and displaying a compensated kinoform, one can reduce crosstalk in the switch. Each wavelength has its own separate sub-kinoform (and these may be optimized for optimum performance using the techniques described in our co-pending UK patent application GB1102715.8).

Figure 18:
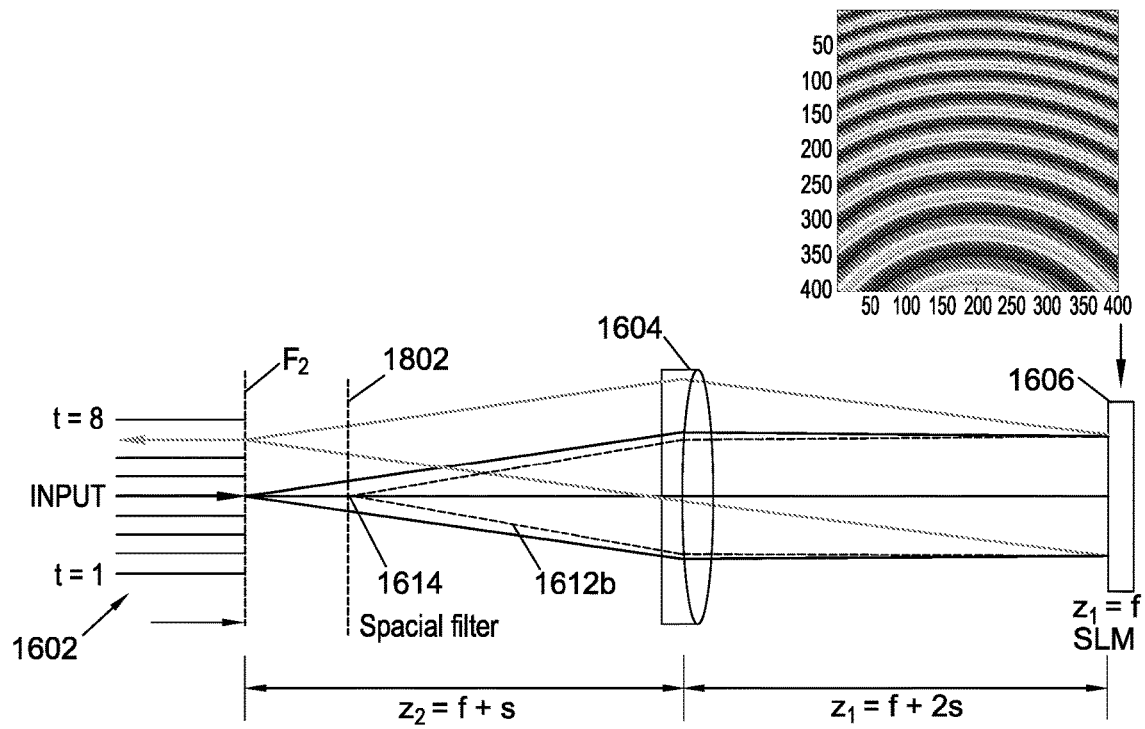
FIG. 18 shows optical beam routing apparatus incorporating zeroth order filtering using defocusing.

FIG. 18 illustrates similar optical beam routing apparatus to that of FIG. 16b, but incorporating a spatial filter 1802. This provides a light block at the location of the zeroth order focus 1614 to attenuate the zeroth order. The skilled person will appreciate that similar spatial filtering may be incorporated into other embodiments of the invention. In addition, the skilled person will appreciate that using this approach can reduce the transient crosstalk that occurs during the change of an interconnection pattern. When a phase grating is reconfigured from period $T_1$ to $T_2$, optical power can be diffracted to all output locations as the grating displayed on an LCOS SLM is changed due to the periodicity of the changing pattern. Although this can be mitigated by using a step-wise reconfiguration (the phase pattern being changed in a finite number of steps so as to minimise the crosstalk), this will increase the overall reconfiguration time. However, transient crosstalk can be mitigated if we use a wavefront encoded approach. Whilst a pattern is changing there is no localization of optical power at the output fibres due to the lack of symmetry as the pattern is switched.

Optimization of Phase Pattern

A Fourier-transform can be used to design kinoforms/holograms for beam-steering switches using an iterative algorithm, such as the Gerchberg-Saxton routine when the replay field is located at the Fourier plane of a lens. In a wavefront encoded system based on the purposeful introduction of defocusing, the replay field is no longer positioned at the Fourier plane of replay lens, but at some alternative plane longitudinally shifted by a distance s, such that $z_2=f+s$. In this case one can use some other transform to relate the field at the kinoform plane to the replay plane. One such algorithm is the fractional Fourier transform. (An alternative calculation approach is to consider the one or more optical outputs as point sources and to propagate waves back from these to define the desired phase and amplitude at a selected plane, until the kinoform/hologram is determined).

Mathematical Perspective

The fractional Fourier transform is a well-known function that has been used in optics, signal processing, and quantum mechanics. From a pure mathematics perspective, it can be expressed as $$E_1(u', v') = \int_{-\infty}^{\infty}\int_{-\infty}^{\infty} K_A(x', y', u', v')E_H(x', y')dx' dy' \quad (9)$$

where $$K_A(x', y', u', v') = A_\phi \exp[i\pi(\cot(\phi)u'^2 - 2\csc(\phi)u'x' + \cot(\phi)x'^2)] \times \quad (10)$$
$$A_\phi \exp[i\pi(\cot(\phi)v'^2 - 2\csc(\phi)v'y' + \cot(\phi)y'^2)]$$

$$\phi = \frac{a\pi}{2} \quad (11)$$

$$A_\phi = \sqrt{1 - i\cot\phi} \quad (12)$$

The term $A_\phi$ is simply a system constant, and when a=1 we have the standard Fourier transform. From inspection we can infer that the form of equation (9,10) is due to a quadratic phase factor added to a Fourier transform, the same sort of factor a lens imparts on an optical field.

From the Optics Perspective

A Fourier transform directly relates an input field to the spatial frequency components making up that field. There are many texts that describe the fractional Fourier transform as relating the same input field to an intermediate plane that can be described as comprising a combination of spatial and frequency elements [see, for example, H. M. Ozaktas and D. Mendlovic, "Fractional Fourier optics", J. Opt. Soc. Am. A, 12, pp 743-748 (1995); and L. M. Bernardo, "ABCD matrix formalism of fractional Fourier optics", Opt. Eng. 35, pp 732-740 (1996)].

Any optical system comprising an input plane, an output plane, and a set of optics in between can be represented using an ABCD matrix (used in ray-tracing and Gaussian beam propagation theory). According to S. A. Collins, "Lens-System Diffraction Integral Written in Terms of Matrix Optics", J. Opt. Soc. Am, 60, pp 1168-1177 (1970), diffraction through lens systems can be defined in terms of the ABCD matrix that results in an overall expression of the output field with respect to the input field and ABCD matrix coefficients as:

$$E_1(u, v) = \int_{-\infty}^{\infty}\int_{-\infty}^{\infty} E_H(x, y) \quad (13)$$
$$\exp\left(-i\frac{k}{2B}[A(x^2 + y^2) + D(u^2 + v^2) - 2(xu + yv)]\right)dxdy$$

If the ABCD matrix meets certain symmetry conditions (see Collins, ibid), we can rearrange equation (13) to the same form as equation (9-12). Hence we have a fractional Fourier transform. There are two standard configurations, the Lohmann type I and II geometries [A. W. Lohmann, "Image rotation, Wagner rotation, and the fractional Fourier transform", J. Opt. Soc. Am A, 10, 2181-2186 (1993).]. It is the first (lens positioned halfway between the input and output planes) that we are interested in at the moment as it comes closest to representing wavefront encoding using defocusing. This entails that the distance from the SLM to the focusing lens, and the distance from the focusing lens to the replay plane (+1 order focal plane), both equal f+s, where f is the focal length of the focusing lens, and s is the defocus. If this is the case, then we can express $\phi$ as $$\cos\phi = 1 - \frac{f+s}{f} \quad (14)$$

Figure 19A:
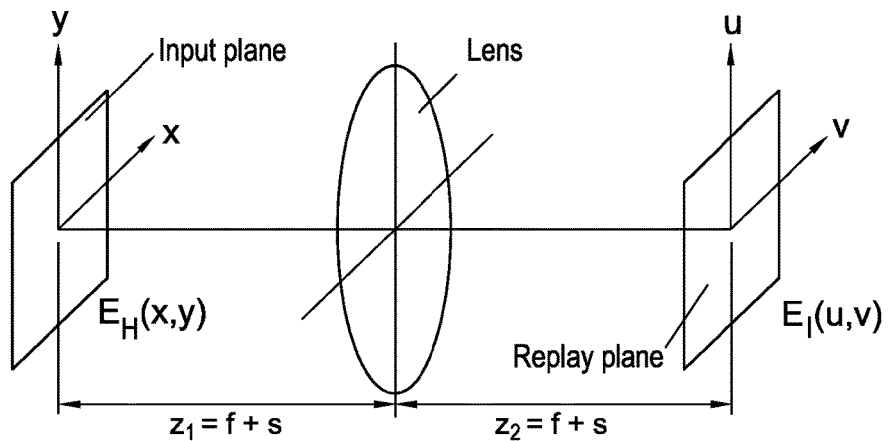
FIGS. 19a and 19b show, respectively, geometry and variables used in the mathematical analysis of a Lohmann type I fractional Fourier transform optical system, and a version of FIG. 19a based on an equivalent three lens optical representation.

Let us assume that we have a fractional Fourier-transform system, as shown in FIG. 19a, comprising a single lens, and input field, $E_H(x,y)$, positioned a distance $z_1$ in front of this plane, and the output plane positioned at distance $z_2=z_1$ behind the lens, where a field, $E_I(u,v)$ is generated. For generality we set $z_1$=f+s. The scaling factor, $\xi$, which relates the transverse scale of the input and replay fields to s using the transforms x'=x/$\xi$, y'=y/$\xi$, u'=u/$\xi$, and v'=v/$\xi$. This has a value of $$\xi^4 = \lambda^2(f+s)f\left(2 - \frac{f+s}{f}\right) \quad (15)$$

Thus, if s=0, we have a=1 and $\xi^2=\lambda f$, and equation (9) simplifies to the standard Fourier Transform relationship for an optical system of the type of FIG. 16a:

$$E_I(u, v) = \int\int_{-\infty}^{\infty} \exp\left(-i\frac{2\pi}{f\lambda}(xu + yv)\right)E_H(x, y)dxdy \quad (16)$$

Figure 19B:
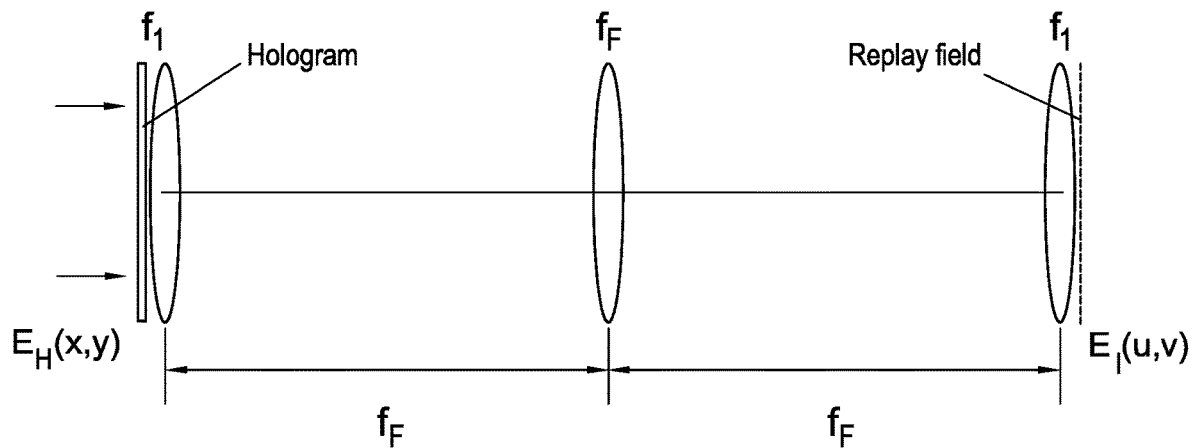

One of the advantages of using a fractional Fourier transform is that it can be expressed in terms of fast Fourier transforms, thereby allowing for rapid calculation and optimization of the replay field as described by Ozaktas et al [H. M. Ozaktas, O. Arikan, M. A. Kutay, and G. Bozdagi, "Digital computation of the fractional Fourier transform", IEEE Transactions on Signal Processing, 44, 2141-2150 (1996)]. The design of diffractive elements by this fast fractional Fourier transform approach was reported by Zhang et al [Y. Zhang, B. Z. Dong, B. Y Gu, and G. Z. Yang, "Beam shaping in the fractional Fourier transform domain", J. Opt. Soc. A, 15, 1114-1120 (1998)], and Zalevsky et al [Z. Zalevsky, D. Mendlovic, and R. G. Dorsch, "Gerchberg-Saxton algorithm applied to the fractional Fourier or the Fresnel domain", Optics Letters 21, 842-844 (1996)]. Their analyses showed that certain sampling criteria should be met to ensure an accurate representation of the replay field. To circumvent this issue one can use the equivalent optical system approach developed by Testorf [M. Testorf, "Design of diffractive optical elements for the fractional Fourier transform domain: phase-space approach", Appl. Opt. 45, 76-82 (2006)]. This allows calculation of the replay field for any fractional order. In Testorf's analysis, the Lohmann type I system of FIG. 19a was replaced by an equivalent three lens system as shown in FIG. 19b. The input plane is immediately before the first lens, and the output lens is immediately after the last lens. The distance from the first lens to the central lens is $f_f$, and the distance from the central lens is likewise $f_f$. The first and last lenses have a focal length of $f_1$, and the central lens has a focal length of $f_f$. This system has an ABCD matrix with the required symmetry for a fractional Fourier transform to be applied if we set the values for $f_F$ and $f_1$ as $$f_F = f\sin^2\phi \quad (17a)$$

$$f_1 = -\frac{f_F}{\cos\phi} \quad (17b)$$

where f is the focal length of the lens of FIG. 16b, and $\phi$ is given by equation (14).

In the paper by L. Bernardo, "ABCD matrix formalism of fractional Fourier optics" (ibid), it is shown how to describe an optical system where the beam illuminating the input plane (the SLM plane) is not planar in terms of a fractional FFT. This is the situation for the wavefront encoded system based on defocusing described above.

Let us consider FIG. 20a, which shows the switch of FIG. 16b unfolded into a transmission system to more clearly relate how the optical system parameters affect the formulation of the fractional Fourier transform. The input fiber is positioned at plane $P_{IN}$, whilst the output fibers are positioned at planes $P_R$ (both equivalent to $F_2$ in FIG. 16b). Lenses $L_1$ and $L_2$ are identical, and have a focal length of f. Let us consider the case where $z_2=f+s$, with s being positive. The wavefront incident on $\Sigma_H$ is therefore convergent, and the beam focused a distance $d_o$ from the lens as shown. The distance from the $\Sigma_H$ to the focal plane is given by $d_H=d_o-z_1$. As a result, the radius of curvature of the incident beam at $\Sigma_H$, $\rho_H=-d_H$, is given by $$\rho_H = z_1 - f - \frac{f^2}{s} \quad (18)$$

where $\rho_H$ is negative if the beam incident on the hologram is focused to the right of $\Sigma_H$, and positive appears to come from a virtual focus to the left of $\Sigma_H$, Equation (18) is derived by applying the thin lens formula to FIG. 15b. According to the analysis Bernardo and Soares [L. M. Bernardo and O. D. Soares, "Fractional Fourier transforms and imaging", J. Opt. Soc. Am. A, 11, 2622-2626 (1994)], for a fractional Fourier transform to be valid when the hologram plane is illuminated by a non-planar wavefront, $z_2$, must be related to $z_1$ and $\rho_H$ by $$z_2 = \frac{\rho_H + f}{\rho_H + z_1 - f} z_1 \quad (19)$$

Thus we can determine the optimum value of $z_1$ such that the system of FIG. 15(a) performs a fractional Fourier transform by combining equation (18) with equation (19) and solving the resultant quadratic equation to give $z_1=f+2s$. If we meet this condition, the system of FIG. 20 (non-planar beam incident on the SLM) converts to case shown in FIG. 19a (planar beam incident on the SLM). However, we now have $z_1=z_2=f+2s$, with a is given by equation (14) using a modified lens focal length, $f_p$, of $$f_p = \frac{\rho_H f}{\rho_H + z_1 - f} \quad (20)$$

This scaled focal length and new value of φ takes into account the nature of the non-planar beam incident on the hologram plane, and with these new parameters we can use the equivalent model representation described previously to calculate the replay field of a quantized SLM in a wavefront encoded switch. With reference to FIG. 20a, the focal length of the holographic lens, $f_H$, required to focus an incident wavefront with radius of curvature $-\rho_H$ at the replay plane must be such that the wavefront of curvature of the +1 order exiting the SLM is also $-\rho_H$. This ensures that the light diffracted from the SLM is optimally focused into the output fibers. Thus, from geometric optics $$f_H = -(\tfrac{1}{2}) \rho_H \quad (21)$$

Note that the above analysis is valid for a transmissive SLM. In the case the reflective SLM of FIG. 18, the required focal length is the negative of Equation (21).

Optimization

As will be shown by example, the fractional FFT fits straightforwardly into "ping pong" algorithms. (Broadly speaking a "ping pong" algorithm comprises initialising a phase distribution for the kinoform, for example randomly or based on an initial target replay field, calculating a replay field of the kinoform, modifying an amplitude distribution of the replay field but retaining the phase distribution, converting this modified replay field to an updated kinoform and then repeating the calculating and modifying to converge on a desired target replay field).

Fourier transforms are fast and therefore well suited to calculating replay field and in optimizing the kinoform phase pattern in standard Fourier plane systems. According to Ozaktas et al [H. M. Ozaktas, O. Arikan, M. A. Kutay, and G. Bozdagi, "Digital computation of the fractional Fourier transform", IEEE Transactions on Signal Processing, 44, pp 2141-2150 (1996)], it is possible to convert equations (9-12) to a form that uses standard FFTs and IFFTs. There are other algorithms that can be used to calculate the replay field in a wavefront encoded system (direct Fresnel integral for example). However, according to Ozaktas et al, using a Fresnel integral based solution uses $O[N^2]$ calculations, whilst using their implementation we use $O[N \times \log(N)]$ steps. It is faster than other approaches provided that the associated limitations on the optical geometry are acceptable.

Using the equivalent method developed by Testorf we calculate the replay field, $E_I(u,v)$, using only four steps. Firstly the plane wavefront, which we denote as $E_{in}(x,y)$ to take into account any amplitude profile, is incident on the SLM. The pixilated LCOS SLM is assumed to display a phase-only hologram represented by $\alpha(x,y)$, where $0 \leq \alpha(x,y) < 2\pi$. The resulting transmitted wavefront, $E_H(x,y)$, is the product of these two terms. In step 2, the first lens of FIG. 19a, $f_1$, imparts a quadratic phase curvature on $E_H(x,y)$. In step 3, the central lens, $f_f$ performs a Fourier-transform on the wavefront exiting lens $f_1$. Finally, the last lens of FIG. 19a, $f_2$, imparts a quadratic phase curvature on the wavefront such that the output field, $E_I(u,v)$ is given by $$E_I(u, v) = FT\left(E_{in}(x, y)\exp[i\alpha(x, y)]\exp\left[\frac{-ik(x^2 + y^2)}{2f_1}\right]\right)\exp\left[\frac{-ik(u^2 + v^2)}{2f_2}\right] \quad (22)$$

Where $f_1=f_2$. We write this as $E_1(u,v)=\text{FrFFT}(E_H(x,y))$. In the actual calculation we use an FFT for step 3, with a spatial sampling corresponding to the N×N pixels of the SLM plane. Thus the fields at all planes are uniformly spatially sampled on an N×N grid, with the sampled u coordinate being given by $$u = n \frac{\lambda f_f}{N \Delta} \quad (23)$$

where Δ is the pixel size, and n is an integer varying from $-N/2$ to $N/2$. The same scaling factor relates v to y.

In the case of the system of FIG. 18, where the incident beam is non-planar, we set $z_1=f+2s$ and $z_2=f+s$. To convert this to the model of FIG. 19b, the effective focal length, $f_p$, is calculated using equation 20. We then set f=$f_p$ and calculate ϕ, $f_F$, and $f_1$ using equations 14, 17a, and 17b. The wavefront at the hologram plane is now treated as plane, but with the original amplitude distribution—for example Gaussian. This allows us to calculate the replay, as required for kinoform optimization.

For further background information on fractional Fourier transforms reference may be made to the following sources: H. M. Ozaktas, "The Fractional Fourier Transform: with Applications in Optics and Signal Processing", John Wiley & Sons (2001); A. W. Lohmann, "Image rotation, Wigner rotation, and the fractional Fourier transform", J. Opt. Soc. Am A, 10, pp 2181-2186 (1993); I. Moreno, J. A. Davis, and K. Crabtree, "Fractional Fourier transform optical system with programmable diffractive lenses", Appl. Opt. 42, pp. 6544-6548 (2003); D. Palima and V. R. Dania, "Holographic projection of arbitrary light patterns with a suppressed zeroth-order beam", Appl. Opt. 46, pp 4197-4201 (2007); S-C Pei and M-H Yeh, "Two dimensional fractional Fourier transform", Signal Processing 67, 99-108 (1998); and X. Y. Yang, Q. Tan, X Wei, Y Xiang, Y. Yan, and G. Jin, "Improved fast fractional-Fourier-transform algorithm", J. Opt. Soc. Am. A, 21, 1677-1681 (2004). Fractional fast Fourier transform code available from the following web sites: www2.cs.kuleuven.be/~nalag/research/software/FRFT/—for 1D code, and www.ee.bilkent.edy.tr/~haldun/fracF.m—for 2D code.

Example Sub-hologram Phase Pattern Calculation in a Fourier Plane System Using the Gerchberg Saxton Algorithm Many techniques may be employed to calculate a suitable sub-hologram phase pattern given a target desired output field. One example procedure is the Gerchberg-Saxton algorithm (illustrated by the following pseudo-Matlab code which follows). Thus FIG. 16a shows the replay field and FIG. 16b the subsequent kinoform pattern when one uses the Gerchberg Saxton algorithm to optimize the phase pattern. This is an example of a "ping-pong" algorithm; the program used to generate the kinoform was based on Matlab code, which has the basic form below:

```
gin = Amplitude distribution of input field (Gaussian profile assumed)
grossout = Desired output field (the target function).  For example, if we have GN
addressable output points
grossout = zeros(GN);
grossout(position 1) = 1;
grossout(position 2) = 1;
Sets two points to have equal amplitude and the other points zero amplitude
gprime = Kinoform phase pattern
for ite=1:200
    if ite==1
    % start with result of geometrical ray-tracing (initial starting point – FFT of input field)
        ftg=fftshift(fft(fftshift(gin)));
    else
    % All other iterations use this (FFT of input field×exp(i*phase of hologram))
        ftg=fftshift(fft(fftshift(gin.*exp(i.*gprime))));
    end
    % Calculate the phase of ftg (dump amplitude information)
    angle_ftg=angle(ftg);
    % Then to get the hologram phase we take the IFFT of the target function
multiplied by
        exp(i*the phase of angle_ftg)
        gprime=angle(fftshift(ifft(fftshift(grossout*exp(i.*angle_ftg)))));
end
```

For this calculation the SLM comprised a linear array of 400 pixels of pixel size 15 μm, with the SLM illuminated by a collimated Gaussian replay field of beam radius 2 mm at a wavelength of 1550 nm. The replay position is located −0.75 mm from the optical axis, and the phase values were allowed to take any value between 0 and 2π.

Example Sub-hologram Phase Pattern Calculation in a Defocused System Using a Modified Gerchberg-Saxton Algorithm To optimize the replay field using a fractional FFT of order a, written as FrFFT[field, a], we can modify the Gerchberg Saxton "ping-pong" algorithm as follows below (other algorithms, in particular other "ping-pong" algorithms may alternatively be employed).

```
gin = Amplitude distribution of input field (Gaussian profile assumed)
grossout = Desired output field (the target function).  For example, if we have GN
addressable output points
grossout = zeros(GN);
grossout(position 1) = 1;
grossout(position 2) = 1;
Sets two points to have equal amplitude and the other points zero amplitude
gprime = Kino form phase pattern
for ite=1:200
    if ite==1
```

```
    % start with result of geometrical ray-tracing (initial starting point - FFT of input
field)
        ftg=FrFFT(gin, a);
    else
        % All other iterations use this (FFT of input field×exp(i*phase of hologram))
        ftg=FrFFT(gin.*exp(i.*gprime, a);
    end
    % Calculate the phase of ftg (dump amplitude information)
    angle_ftg=angle(ftg);
        % Then to get the hologram phase we take the IFFT of the target function
multiplied by
        exp(i*the phase of angle_ftg)
        gprime=angle(FrFFT(grossout.*exp(i.*angle_ftg), 2-a);
```

Here the fractional Fourier transform FrFFT may be implemented using standard FFTs available in off-the-shelf code. We make use of the fact that an inverse FrFFT of a FrFFT[field, a] can be calculated using FrFFT[field, 2-a] [see for example Ozaktas, ibid].

More generally, however, one can calculate a suitable phase hologram pattern based on the transfer function of the optical system.

Wavefront Encoding for Security

We now describe the use of wavefront encoding techniques for improving the security of a WSS, in particular by employing a matched spatial filtering embodiment. An example is illustrated in FIG. 1.

Figure 21:
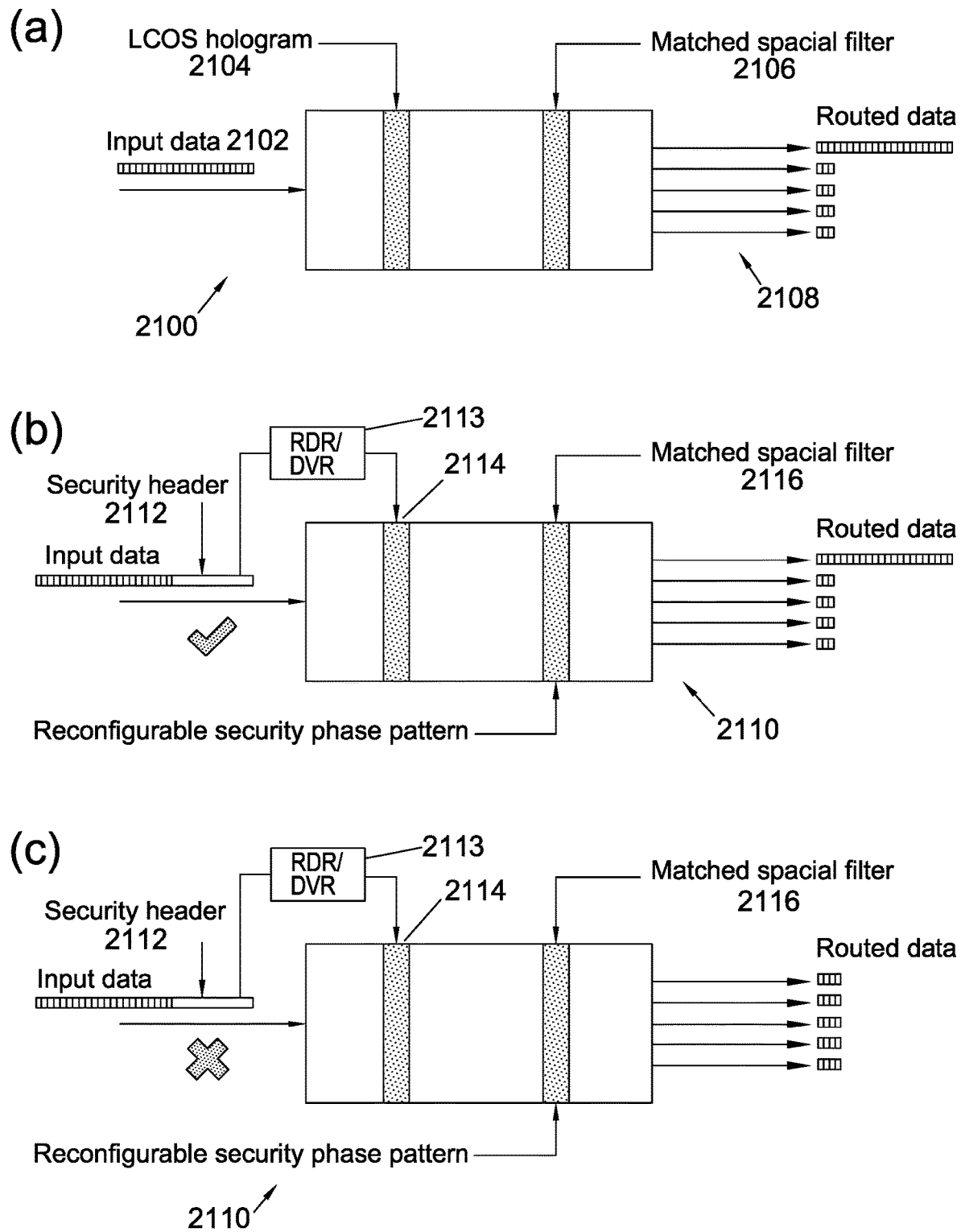
FIGS. 21a to 21c show operation of a WSS where a reconfigurable matched spatial filter is used to both reduce crosstalk and to act as a security key according to embodiments of the invention, illustrating examples where (a) the sub-hologram phase pattern matches the fixed matched spatial filter phase pattern; (b) the security header sub-hologram phase pattern matches the current reconfigurable matched spatial filter phase pattern; and (c) the security header sub-hologram phase pattern does not match the current reconfigurable matched spatial filter phase pattern.

Referring to FIG. 21a, this shows a generic configuration of an optical router/switch 2100 including a predetermined static matched spatial filter 2106. Optical input data 2102 is routed by a sub-hologram phase pattern on LCOS SLM 2104. The sub-hologram is optimized to maximize the signal routed to the required output port(s) 2108, and to minimize crosstalk to the non-interconnected output ports. The sub-hologram also compensates for the presence of the matched spatial filter 2106.

FIG. 21b shows a generic optical router/switch 2110 including a hardwired security feature. In operation:

The data being sent through the switch has a header packet 2112 that contains data defining the sub-hologram phase pattern.

This header packet is first read by optical reader/driver 2113.

This data contains both the information for both the port to be steered to (blazed grating period and direction), and for the inverse phase pattern required to match the wavefront encoding matched spatial filter 2116 (in embodiments, displayed on an SLM and reconfigurable)

The sub-hologram phase pattern on SLM 2114 is set using this header packet.

Only if the inverse phase pattern (the key) matches the phase pattern of the matched spatial filter (the lock) will light couple efficiently into the intended output port.

If this is the case, data is sent through the switch to the defined output port.

FIG. 21c corresponds to FIG. 21b but illustrates a case where the header sub-hologram pattern does not match the matched spatial filter pattern. In this case the data does not couple efficiently into any of the output ports.

The matched spatial filter may be implemented using a LCOS SLM, and may therefore be externally reconfigurable (for example, set by the owner of the network). As a result, the lock phase pattern may be periodically updated, and a new key issued for network users.

In a case where, for example, a pixel can have up to 256 distinct phase levels, for a sub-hologram with 50×50 pixels, there are 2500 pixels and in theory $256^{2500}$ combinations. Although in practice the number of optically discrete states (defined as states that produce measurably different insertion loss crosstalk values) is less there are still many different combinations available. Preferred embodiments of the system employ an optimization procedure that simultaneously maximizes the LCOS hologram and matched spatial filter for specific security features.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A wavelength division multiplexed (WDM) reconfigurable optical switch, the switch comprising:
    at least one optical input port to receive a WDM input optical signal comprising a plurality of wavelength channels;
    a plurality of optical output ports;
    at least a first reconfigurable holographic array on an optical path between said at least one optical input port and said plurality of optical output ports; and
    at least one diffractive element on an optical path between at least one optical input port and said reconfigurable holographic array, to demultiplex said WDM input optical signal into a plurality of demultiplexed optical input beam channels, and to disperse said demultiplexed optical input beam channels spatially along a first axis on said reconfigurable holographic array;
    wherein said reconfigurable holographic array comprises an array of configurable sub-holograms, said array extending along said first axis, wherein a sub-hologram is configured to direct a demultiplexed optical input beam channel to a respective selected one of said optical outputs; and
    wherein the switch further comprises one or more beam profiling optical elements to modify transverse beam profiles of said demultiplexed optical input beam channels to modified beam profiles, wherein a said modified beam profile comprises a beam profile having one or more characteristics selected from a group consisting of: a flattened beam profile, a steeper-sided beam profile, and a beam profile which substantially fits a rectangular envelope,
    wherein said one or more beam profiling optical elements are configured to modify said transverse beam profiles of said demultiplexed optical input beam channels such that a transverse spatial dimension of a demultiplexed optical input beam channel substantially matches a corresponding transverse spatial dimension of a said sub-hologram on said first reconfigurable holographic array, and wherein the one or more beam profiling optical elements are located between the at least one optical input port and the first reconfigurable holographic array.

2. A WDM reconfigurable optical switch as claimed in claim 1 wherein said one or more beam profiling optical elements comprise one or more refractive/diffractive optical elements to modify said transverse beam profiles of said demultiplexed optical input beam channels without substantial loss of beam energy.

3. A WDM reconfigurable optical switch as claimed in claim 1 wherein said one or more beam profiling optical elements are configured to flatten said transverse beam profiles of said demultiplexed optical input beam channels.

4. A WDM reconfigurable optical switch as claimed in claim 1 wherein said at least one diffractive element has a transverse phase profile configured to provide beam shaping such that said transverse phase profile of said at least one diffractive element modifies transverse beam profiles of said demultiplexed optical input beam channels to flatten a said beam profile.

5. A WDM reconfigurable optical switch as claimed in claim 1 wherein said one or more beam profiling optical elements comprises an optical surface located substantially adjacent to a location of said at least one diffractive element to add a phase profile to said at least one diffractive element to flatten said beam profile.

6. A WDM reconfigurable optical switch as claimed in claim 1 further comprising relay optics between said at least one diffractive element and one or both of said at least one optical input port and said optical output ports; wherein said relay optics images said reconfigurable holographic array at an intermediate image plane, the switch further comprising a lenslet array between said intermediate image plane and one or both of said at least one optical input port and said optical output ports to increase the effective input/output mode field radius of each said port.

7. A WDM reconfigurable optical switch as claimed in claim 6 wherein said one or more beam profiling optical elements comprise lenses of said lenslet array.

8. A WDM reconfigurable optical switch as claimed in claim 1 wherein said one or more beam profiling optical elements comprises an array of refractive/diffractive optical elements adjacent each of said at least one optical input port and said optical output ports.

9. A WDM reconfigurable optical switch as claimed in claim 1 wherein said reconfigurable holographic array is configured to compensate for optical aberration from said one or more beam profiling optical elements.

10. A WDM reconfigurable optical switch as claimed in claim 1 further comprising one or more beam profiling optical elements to restore said flattened beam profiles of said directed demultiplexed optical beam channels to substantially an original beam profile of said demultiplexed optical input beam channels.

11. A WDM reconfigurable optical switch as claimed in claim 10 configured such that the same said one or more beam profiling optical elements both modify and restore said beam profiles.

12. A method of routing a wavelength division multiplexed (WDM) signal comprising a plurality of wavelength channels, the method comprising:
inputting the WDM signal at an optical input port;
dispersing said WDM signal into a plurality of demultiplexed beams each comprising a WDM channel;
providing said demultiplexed beams to a set of respective beam steering elements each for steering a respective WDM channel;
generating a plurality of steered beams from said beam steering elements, one for each WDM channel; and
routing said steered beams into selected beam outputs using at least a first reconfigurable holographic array;
wherein the method further comprises modifying transverse beam profiles of said demultiplexed beams to modified beam profiles, wherein a said modified beam profile comprises a beam profile having one or more characteristics selected from a group consisting of: a flattened beam profile, a steeper-sided beam profile, and a beam profile which substantially fits a rectangular envelope,
wherein modifying the transverse beam profiles of the demultiplexed beams is performed between the optical input port and the first reconfigurable holographic array such that the transverse beam profiles of the demultiplexed beams substantially matches a transverse spatial dimension of a sub-hologram on the first reconfigurable holographic array.

13. A method as claimed in claim 12 further comprising restoring said beam profiles prior to outputting said steered beams.

14. A method as claimed in claim 12 wherein said modifying comprises converting said beam profiles to flattened beam profiles.

15. A method as claimed in claim 12 wherein the providing said set of respective beam steering elements comprises displaying a set of sub-holograms on a spatial light modulator (SLM); and matching one, or two orthogonal, transverse spatial dimensions of a demultiplexed beam to one or two orthogonal, corresponding transverse spatial dimensions of a said sub-hologram displayed on said SLM.

16. A method as claimed in claim 12 wherein said modifying of said transverse beam profiles is without substantial attenuation of the beams.

17. A wavelength division multiplexed (WDM) reconfigurable optical switch, the switch comprising:
at least one optical input port to receive a WDM input optical signal comprising a plurality of wavelength channels;
a plurality of optical output ports;
a spatial light modulator (SLM) for displaying a reconfigurable holographic array, wherein the SLM is located on an optical path between said at least one optical input port and said plurality of optical output ports; and
at least one diffractive element on an optical path between at least one optical input port and said reconfigurable holographic array, to demultiplex said WDM input optical signal into a plurality of demultiplexed optical input beam channels, and to disperse said demultiplexed optical input beam channels spatially along a first axis on said reconfigurable holographic array;
wherein said reconfigurable holographic array comprises an array of configurable sub-holograms, said array extending along said first axis, wherein a sub-hologram is configured to direct a demultiplexed optical input beam channel to a respective selected one of said optical outputs; and
wherein the switch further comprises:
a matched spatial filter in an optical path between at least one optical input port and one or more of said optical output ports, wherein said matched spatial filter imparts a lock phase pattern;

an optical data reader to read key phase pattern data from said WDM input optical signal; and a driver coupled to said input to drive said SLM, responsive to said key phase pattern data, to display said array of sub-holograms in combination with a key phase pattern which complements a phase pattern of said lock phase pattern to compensate for said matched filter.

18. A WDM reconfigurable optical switch as claimed in claim 17 wherein said optical data reader is further configured to read routing data from said WDM input optical signal, for driving said SLM with sub-hologram data to route a demultiplexed WDM input optical signal according to said routing data, in combination with said key phase pattern.

* * * * *